United States Patent
Lee et al.

(10) Patent No.: US 11,606,751 B2
(45) Date of Patent: Mar. 14, 2023

(54) POWER SAVING SIGNALS IN WIRELESS COMMUNICATION

(71) Applicant: IDAC HOLDINGS, INC., Wilmington, DE (US)

(72) Inventors: Moon-il Lee, Melville, NY (US); Janet A. Stern-Berkowitz, Little Neck, NY (US); Erdem Bala, East Meadow, NY (US); Afshin Haghighat, Ile-Bizard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/269,099

(22) PCT Filed: Aug. 19, 2019

(86) PCT No.: PCT/US2019/047094
§ 371 (c)(1),
(2) Date: Feb. 17, 2021

(87) PCT Pub. No.: WO2020/037319
PCT Pub. Date: Feb. 20, 2020

(65) Prior Publication Data
US 2021/0314866 A1 Oct. 7, 2021

Related U.S. Application Data

(60) Provisional application No. 62/765,010, filed on Aug. 17, 2018, provisional application No. 62/805,172, (Continued)

(51) Int. Cl.
*H04W 52/02* (2009.01)
*H04W 76/28* (2018.01)

(52) U.S. Cl.
CPC ....... *H04W 52/0229* (2013.01); *H04W 76/28* (2018.02)

(58) Field of Classification Search
CPC ......... H04W 52/0229; H04W 52/0235; H04W 76/28; Y02D 30/70
(Continued)

(56) References Cited

U.S. PATENT DOCUMENTS

2015/0003311 A1  1/2015  Feuersaenger et al.
2015/0099558 A1* 4/2015  Zehr ............... H04W 52/36
                                                  455/522
(Continued)

FOREIGN PATENT DOCUMENTS

JP    2015-512178 A    4/2015
WO    2015018045 A1    2/2015

OTHER PUBLICATIONS

Ericsson, "Wake Up Signal in NB-IoT and MTC," 3GPP TSG-RAN2 Meeting #101, R2-1802586, Athens, Greece (Feb. 26-Mar. 2, 2018).
(Continued)

Primary Examiner — Tan H Trinh
(74) Attorney, Agent, or Firm — Flaster Greenberg, P.C.

(57) ABSTRACT

Systems, methods, and devices for addressing power savings signals in wireless communication. A wireless transmit receive unit (WTRU) may monitor for an energy saving signal (ESS) while the WTRU is asleep (e.g., prior to a discontinuous reception (DRX) ON duration that includes one or more search spaces). The WTRU may measure the energy of the ESS. If the ESS is below a threshold, the WTRU fallback to a default operation or continue in a current operating mode (e.g., remain asleep to save power). If the ESS is above a threshold, the ESS may be received using a coverage enhancement (CE) level based on a param-
(Continued)

eter associated with a search space. The parameter may be the highest aggregation level of the one or more search spaces.

18 Claims, 16 Drawing Sheets

Related U.S. Application Data filed on Feb. 13, 2019, provisional application No. 62/825,509, filed on Mar. 28, 2019.

(58) Field of Classification Search
USPC .................................................. 455/69, 522
See application file for complete search history.

(56) References Cited

U.S. PATENT DOCUMENTS

| | | | | |
|---|---|---|---|---|
| 2016/0286603 | A1* | 9/2016 | Vajapeyam | H04W 72/0453 |
| 2016/0295636 | A1* | 10/2016 | Yang | H04W 76/28 |
| 2017/0019852 | A1* | 1/2017 | Yang | H04W 52/0216 |
| 2017/0026948 | A1* | 1/2017 | Yang | H04W 36/30 |
| 2017/0208523 | A1* | 7/2017 | Yang | H04W 76/28 |
| 2017/0272999 | A1* | 9/2017 | Tsai | H04W 52/0216 |
| 2018/0007734 | A1 | 1/2018 | Kela et al. | |
| 2018/0097598 | A1 | 4/2018 | Ang et al. | |
| 2018/0098287 | A1 | 4/2018 | Ang et al. | |
| 2019/0312758 | A1* | 10/2019 | Liu | H04L 25/03866 |
| 2019/0349856 | A1* | 11/2019 | Liu | H04W 72/0453 |
| 2020/0404589 | A1* | 12/2020 | Wang | H04W 52/0235 |
| 2021/0306952 | A1* | 9/2021 | Kuang | H04W 52/0235 |
| 2021/0368444 | A1* | 11/2021 | Wang | H04W 72/0446 |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital, Inc., "Discussion on Triggering of Power Mode Adaptation," 3GPP TSG RAN WG1 Meeting #95, R1-1813244, Spokane, USA (Nov. 12-16, 2018).

Interdigital, Inc., "On Triggering of Power Mode Adaptation," 3GPP TSG RAN WG1 Ad-Hoc Meeting 1901, R1-1900814, Taipei, Taiwan (Jan. 21-25, 2019).

Interdigital, Inc., "On UE Power Saving Techniques," 3GPP TSG RAN WG1 #96, R1-1902619, Athens, Greece (Feb. 25-Mar. 1, 2019).

Interdigital, Inc., "PDCCH-based Power Saving Signal Design Considerations," 3GPP TSG RAN WG1 #96b, R1-1905409, Xi'an, China (Apr. 8-12, 2019).

Interdigital, Inc., "PDCCH-based Power Saving Signal Design," 3GPP TSG RAN WG1 #97, R1-1907104, Reno, USA (May 13-17, 2019).

Mediatek Inc., "Wake Up Signal Configuration for NB-IoT," 3GPP TSG RAN WG1 Meeting #92bis, R1-1804139, Sanya, China (Apr. 16-20, 2018).

Nokia et al., "Wake-up signal configurations and procedures," 3GPP TSG RAN WG1 Meeting #91, R1-1720133, Reno, USA (Nov. 27-Dec. 1, 2017).

Third Generation Partnership Project, "Technical Specification Group Radio Access Network; NR; Physical channels and modulation (Release 15)," 3GPP TS 38.211 V15.2.0 (Jun. 2018).

Third Generation Partnership Project, "Technical Specification Group Radio Access Network; NR; Physical channels and modulation (Release 15)," 3GPP TS 38.211 V15.6.0 (Jun. 2019).

Third Generation Partnership Project, "Technical Specification Group Radio Access Network; NR; Multiplexing and channel coding (Release 15)," 3GPP TS 38.212 V15.6.0 (Jun. 2019).

Third Generation Partnership Project, "Technical Specification Group Radio Access Network; NR; Multiplexing and channel coding (Release 15)," 3GPP TS 38.212 V15.2.0 (Jun. 2018).

Third Generation Partnership Project, "Technical Specification Group Radio Access Network; NR; Physical layer procedures for control (Release 15)," 3GPP TS 38.213 V15.2.0 (Jun. 2018).

Third Generation Partnership Project, "Technical Specification Group Radio Access Network; NR; Physical layer procedures for control (Release 15)," 3GPP TS 38.213 V15.6.0 (Jun. 2019).

Third Generation Partnership Project, "Technical Specification Group Radio Access Network; NR; Physical layer procedures for data (Release 15)," 3GPP TS 38.214 V15.2.0 (Jun. 2018).

Third Generation Partnership Project, "Technical Specification Group Radio Access Network; NR; Physical layer procedures for data (Release 15)," 3GPP TS 38.214 V15.6.0 (Jun. 2019).

Third Generation Partnership Project, "Technical Specification Group Radio Access Network; NR; Medium Access Control (MAC) protocol specification (Release 15)," 3GPP TS 38.321 V15.2.0 (Jun. 2018).

Third Generation Partnership Project, "Technical Specification Group Radio Access Network; NR; Medium Access Control (MAC) protocol specification (Release 15)," 3GPP TS 38.321 V15.6.0 (Jun. 2019).

Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.2.0 (Jul. 2018).

Third Generation Partnership Project, "Technical Specification Group Radio Access Network; Evolved Universal Terrestrial Radio Access (E-UTRA); Medium Access Control (MAC) protocol specification (Release 15)," 3GPP TS 36.321 V15.6.0 (Jun. 2019).

Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.2.0 (Jun. 2018).

Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.2.2 (Jun. 2018).

Third Generation Partnership Project, "Technical Specification Group Radio Access Network; Evolved Universal Terrestrial Radio Access (E-UTRA); Radio Resource Control (RRC); Protocol specification (Release 15)," 3GPP TS 36.331 V15.6.0 (Jun. 2019).

(56) References Cited

OTHER PUBLICATIONS

3$^{rd}$ Generation Partnership Project (3GPP), "Considerations on wake-up signal for eFeMTC", Huawei, HiSilicon, R1-1704282, 3GPP TSG RAN WG1, Meeting #88bis, Spokane, USA, Apr. 3-7, 2017, 6 pages.

3rd Generation Partnership Project (3GPP), "Wake-up signal configurations and procedures", Ericsson, R-1717010, 3GPP TSG-RAN WG1, Meeting #90bis, Prague, Czech Republic, Oct. 9-13, 2017, 7 pages.

3rd Generation Partnership Project (3GPP), "DRX in NR", Ericsson, Tdoc R2-1702653, 3GPP TSG-RAN WG2, Meeting 97bis, Spokane, USA, Apr. 3-7, 2017, 6 pages.

3rd Generation Partnership Project (3GPP), "Discussion on power saving signal/channel in MTC", LG Electronics, R1-1717279, 3GPP TSG RAN WG1, Meeting 90bis, Prague, Czech Republic, Oct. 9-13, 2017, 14 pages.

\* cited by examiner

POWER SAVING SIGNALS IN WIRELESS COMMUNICATION

CROSS-REFERENCE TO RELATED APPLICATIONS

This application is the U.S. National Stage, under 35 U.S.C. § 371, of International Application No. PCT/US2019/047094 filed Aug. 19, 2019, which claims the benefit of U.S. Provisional Application No. 62/765,010, filed Aug. 17, 2018, U.S. Provisional Application No. 62/805,172, filed Feb. 13, 2019, and U.S. Provisional Application No. 62/825,509, filed Mar. 28, 2019, the contents of which are incorporated herein by reference.

BACKGROUND

In wireless communication systems mobile devices may operate with a limited amount of power provided by a battery, therefore power saving techniques may be useful in prolonging the usefulness of the mobile device. It may be helpful to implement power saving techniques that address signaling protocols, which in turn may also effect the signaling for the overall wireless communications system. There may be a number of use cases that may have a need to improve power efficiency and effectiveness of these communication protocols. These use cases may have a variety of requirements such as a higher data rate, higher spectrum efficiency, lower power, lower latency, higher reliability, and the like.

SUMMARY

Systems, methods, and devices for addressing power savings signals in wireless communication. A wireless transmit receive unit (WTRU) may monitor for an energy saving signal (ESS) while the WTRU is asleep (e.g., prior to a discontinuous reception (DRX) ON duration that includes one or more search spaces). The WTRU may measure the energy of the ESS. If the ESS is below a threshold, the WTRU fallback to a default operation or continue in a current operating mode (e.g., remain asleep to save power). If the ESS is above a threshold, the ESS may be received using a coverage enhancement (CE) level based on a parameter associated with a search space. The parameter may be the highest aggregation level of the one or more search spaces.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
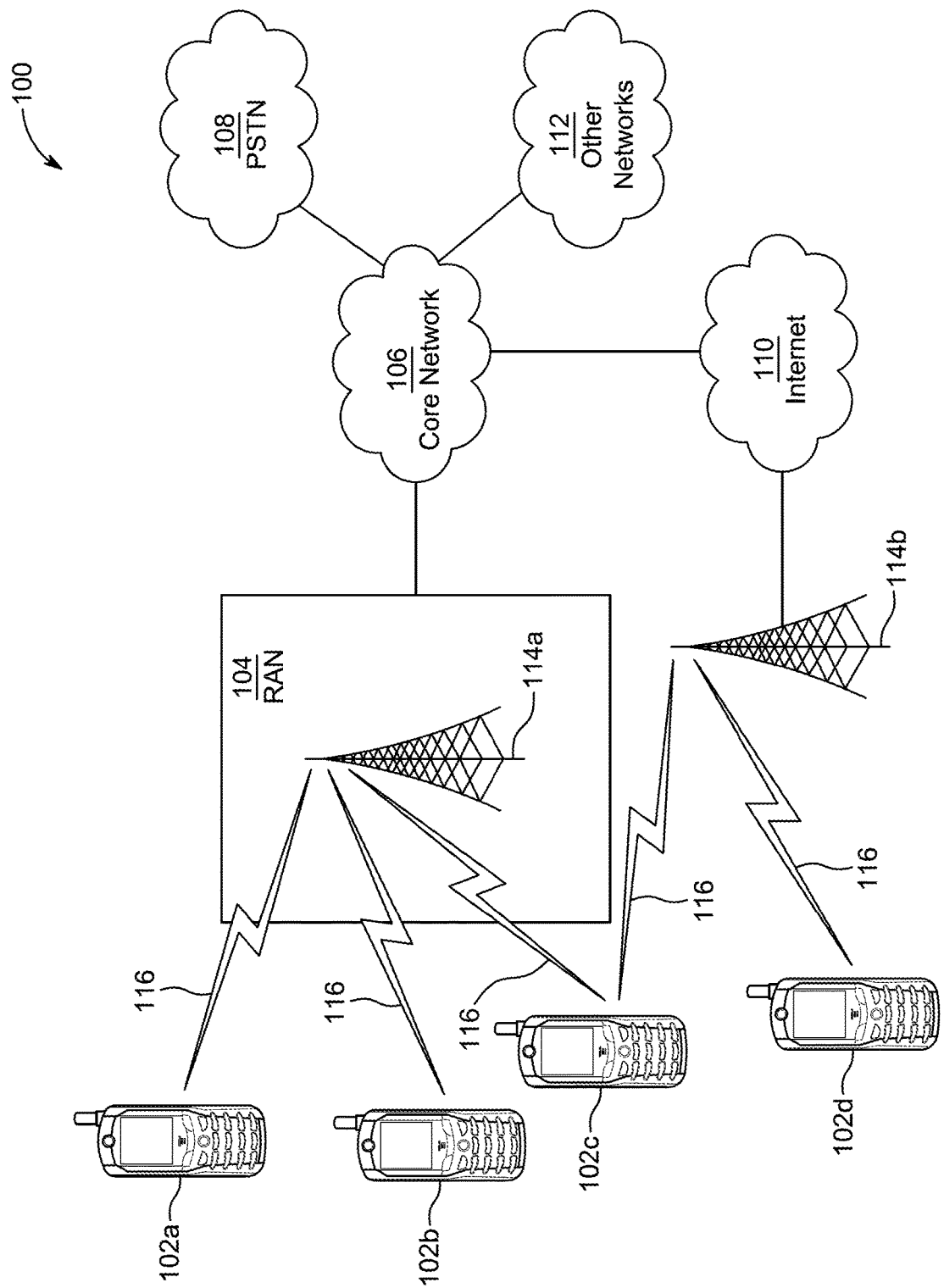
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a WTRU/UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
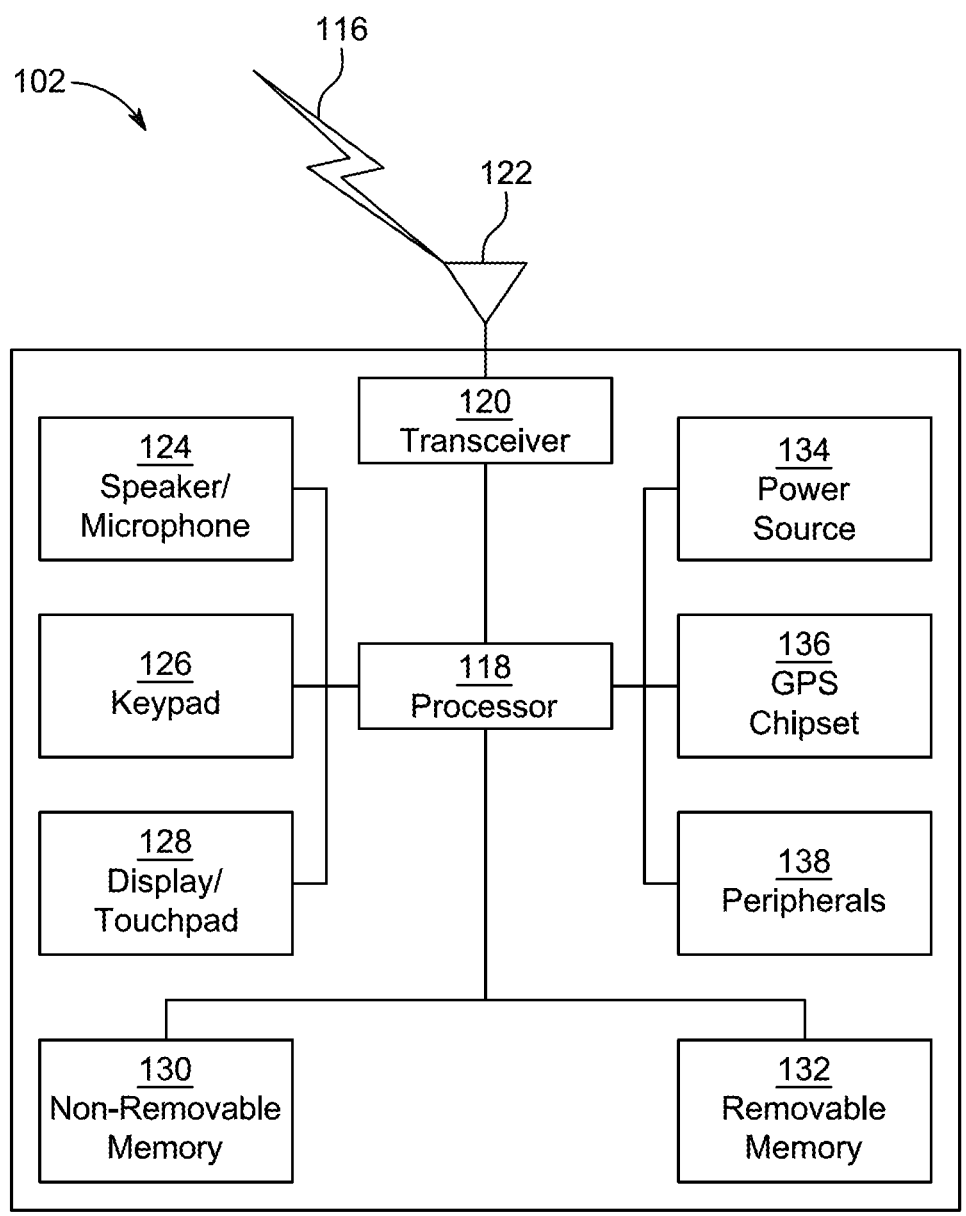
FIG. 1B is a system diagram illustrating an example wireless transmit/receive unit (WTRU) that may be used within the communications system illustrated in FIG. 1A according to an embodiment.
Figure 1C:
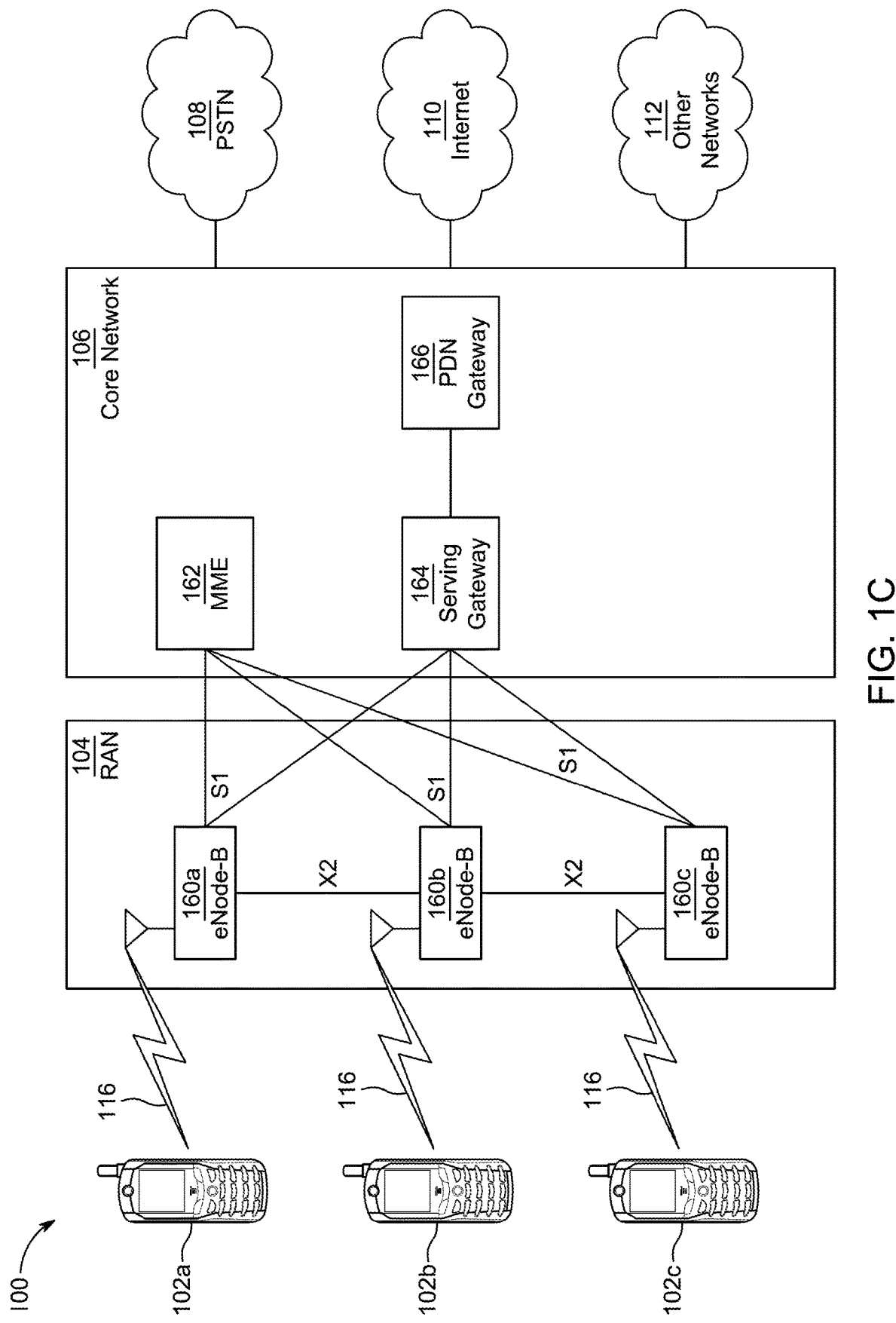
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 10:
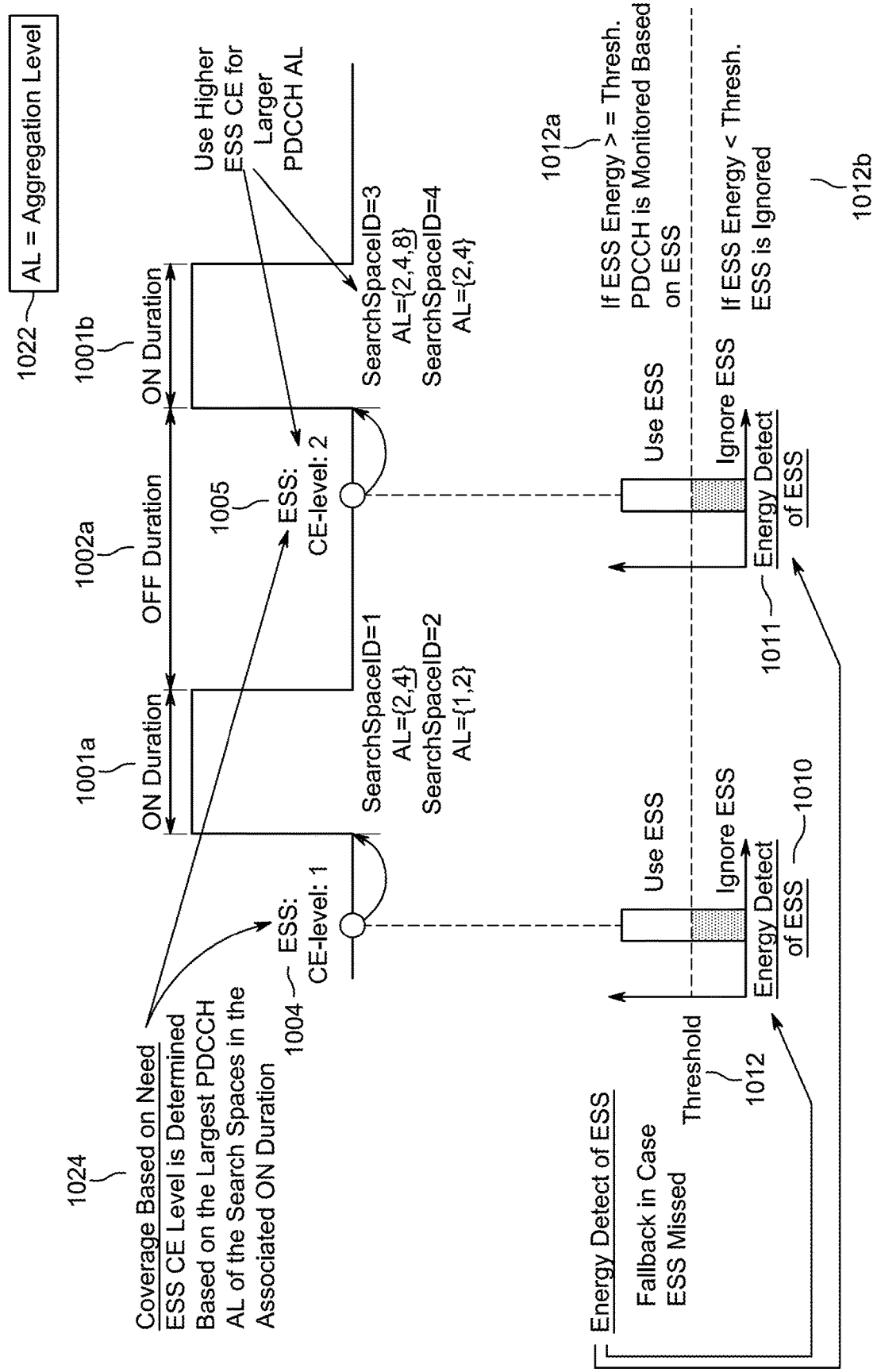
FIG. 10 illustrates an example of determining ESS (e.g., WUS) CE level based on a maximum aggregation level configured for the associate search space.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
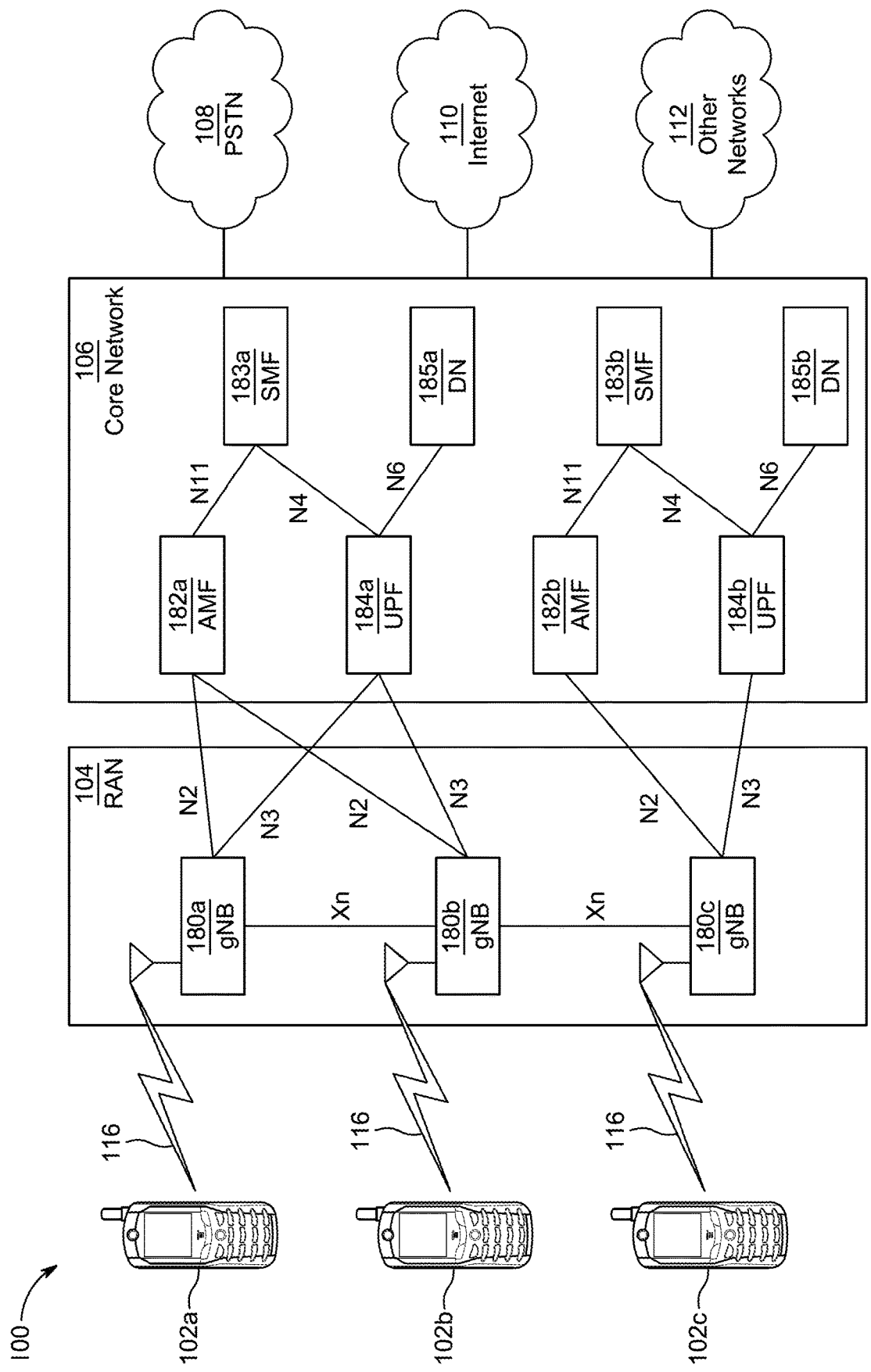
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ a NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
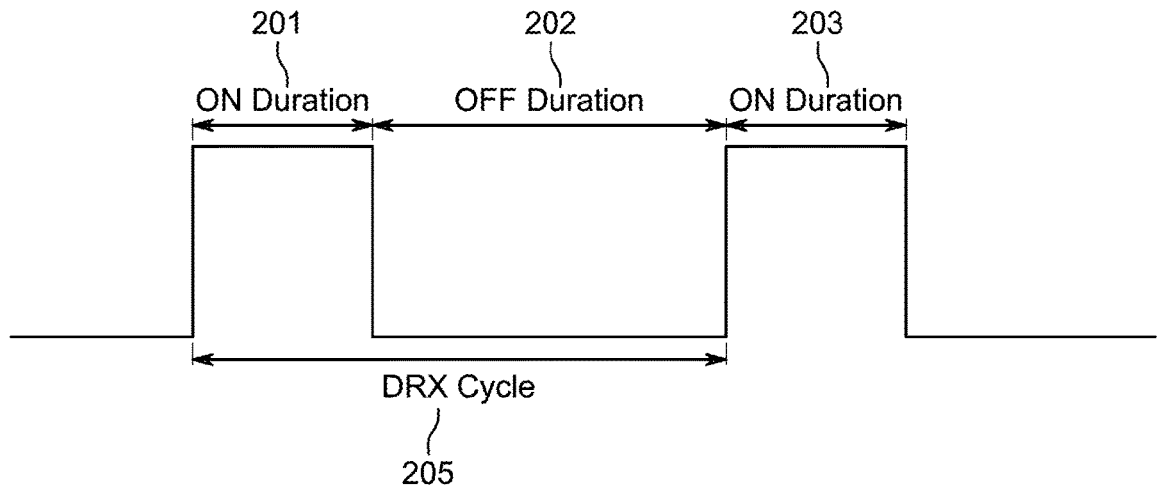
FIG. 2 illustrates an example of a DRX operation.

FIG. 2 illustrates an example of discontinuous reception (DRX). DRX may be used for battery savings for wireless devices (i.e., WTRUs). During DRX operation, a WTRU may not monitor a DL control channel (e.g., physical downlink control channel (PDCCH)). In RRC connected mode, the WTRU may use a connected mode DRX (C-DRX). As shown, there may be on and off periods, such as an ON duration 201, then an OFF duration 202, then an ON duration 203, and so on. The WTRU may monitor a configured PDCCH during an ON duration period (i.e., 201) and the WTRU may sleep (e.g., not monitor the PDCCH) during an OFF duration (i.e., 202). PDCCH as used herein may be a non-limiting example of a DL control channel, and may be interchangeable with any other known DL channel.

A DRX cycle may be a cycle (e.g., a repetition or periodic repetition) of ON duration and OFF duration, such as the full DRX cycle 205 that comprises an ON duration and an OFF duration (i.e., 201 and 202). A WTRU may monitor a PDCCH during an ON duration (i.e., 201) and the WTRU may skip monitoring a (e.g., any) PDCCH during an OFF duration (i.e., 202) for the DRX cycle 205.

A DRX cycle may be a short DRX cycle or a long DRX cycle. A WTRU may use a short DRX cycle for a period of time and then use a long DRX cycle.

A DRX inactivity timer may determine or may be used to determine a time (e.g., in terms of a transmission time interval (TTI) duration), after a PDCCH occasion in which a PDCCH (e.g., a PDCCH that is successfully decoded) indicates an (e.g., an initial) UL or DL user data transmission. The DRX inactivity timer may be used to determine when to go to an OFF duration.

A DRX ON duration may be the duration at the beginning of a DRX cycle.

An ON duration timer may determine or may be used to determine a number of (e.g., a consecutive number of) PDCCH occasion(s) that may be or may need to be monitored or decoded (e.g., by a WTRU), for example after wakeup from a DRX cycle or at the beginning of a DRX cycle.

A PDCCH occasion may be a time period that may contain a PDCCH, where the time period may be one or more symbols, a set of symbols, a slot, a sub slot, a subframe, or the like.

A DRX retransmission timer may determine or may be used to determine a number (e.g., a consecutive number) of PDCCH occasion(s) to monitor when retransmission may be expected by the WTRU. A DRX retransmission timer may determine or may be used to determine a maximum duration until a DL retransmission may be received or a maximum duration until a grant for UL retransmission is received.

A DRX short cycle may be the first DRX cycle that the WTRU enters after expiration of the DRX inactivity timer. A WTRU may be in the short DRX cycle until the expiration of the DRX short cycle timer. When the DRX short cycle timer is expired, the WTRU may use a long DRX cycle.

A DRX short cycle timer may determine or may be used to determine the number of consecutive subframe(s) that the WTRU may follow the short DRX cycle after the DRX inactivity timer has expired.

During the OFF duration, a WTRU may not measure or report channel state information (CSI) in a subframe configured to measure and/or report a periodic CSI reporting.

A WTRU may monitor PDCCH or PDCCH occasions during Active Time. Active Time may occur during an ON duration or Active Time may occur during an OFF duration. Active Time may begin during an ON duration and continue during an OFF duration. Active Time and Active time of a DRX cycle may be used interchangeably herein.

Active Time may include the time while a DRX timer is running such as an ON Duration Timer, an Inactivity Timer, a Retransmission Timer (e.g., in the DL and/or the UL), or random access Contention Resolution Timer.

Active Time may include the time while a Scheduling Request (SR) is sent (e.g., on a physical uplink control channel (PUCCH)) and is pending.

Active Time may include the time while a PDCCH indicating a new transmission addressed to the C-RNTI of a MAC entity of the WTRU has not been received after successful reception of a Random Access Response (RAR) for the Random Access Preamble not selected by the MAC entity among the contention-based Random Access Preamble.

Figure 3:
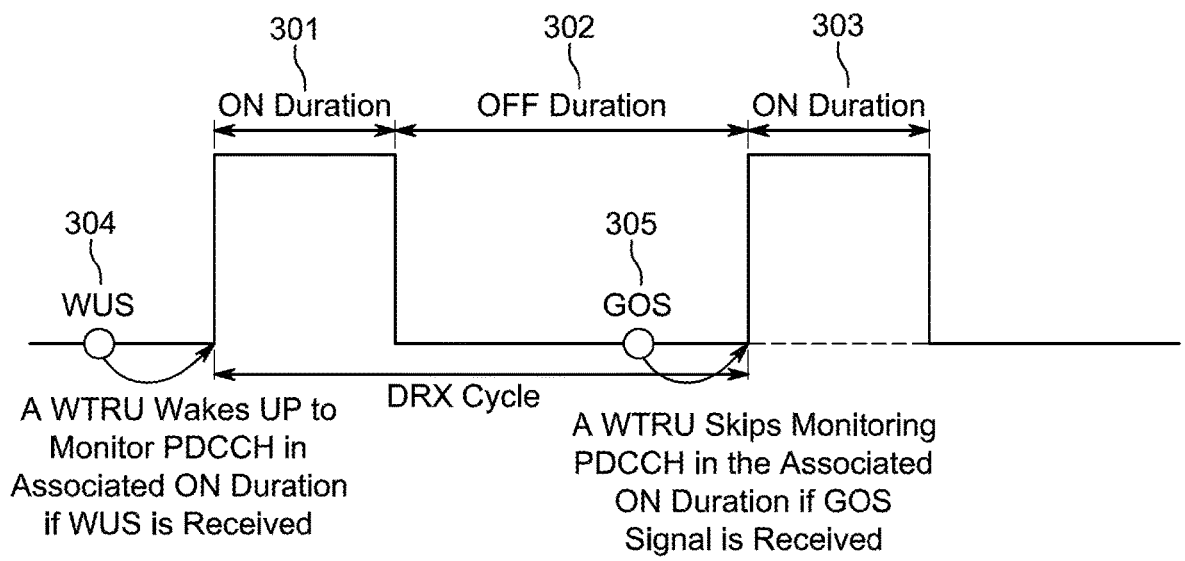
FIG. 3 illustrates an example of a DRX operation with a wake-up signal (WUS) and/or go-to-sleep signal (GOS) (WUS/GOS)

FIG. 3 illustrates an example of a DRX operation with a wake-up signal (WUS) and/or go-to-sleep signal (GOS) (WUS/GOS). A WUS/GOS may be associated with one or more DRX cycles. A WUS/GOS may be transmitted and/or received prior to an associated time or part of a (e.g., an associated) DRX cycle.

At 304, a WTRU may receive a WUS, at which point the WTRU may monitor PDCCH in ON durations (i.e., ON duration 301) for one or more DRX cycles. At 305, a WTRU may receive a GOS, at which point the WTRU may skip monitoring PDCCH in ON durations (i.e., on duration 303) for one or more DRX cycles and may stay in sleep mode (e.g., deep sleep).

In a system or network, either WUS or GOS may be used. Alternatively, both WUS and GOS may be used.

In wireless systems such as New Radio (NR) for 5G, a new structure and design may be used/adopted for the physical downlink control channel (PDCCH), as well as the physical downlink shared channel (PDSCH). Also, slot-based and non-slot-based transmissions and different rates of monitoring may be used for PDCCH.

For a wireless system as discussed herein (e.g., NR), a Resource Element Group (REG) may be the smallest building block for a PDCCH. A (e.g., each) REG may comprise of 12 REs on one OFDM symbol in time and one resource block (RB) in frequency. In a (e.g., each) REG, 9 resource elements (REs) may be used for control information and 3 REs may be used for demodulation reference signal (DMRS). Multiple REGs (e.g., 2, 3, or 6), adjacent in time or frequency, may form an REG bundle used with the same precoder and their DMRSs may be used together for channel estimation. 6 REGs (e.g., in the format of 1, 2, or 3 REG bundles) may form one Control Channel Element (CCE) which may be the smallest possible PDCCH. A (e.g., each) PDCCH may comprise of one or multiple CCEs (e.g., 1, 2, 4, 8, or 16 CCEs). The number of CCEs for a PDCCH may be called its aggregation level (AL).

Mapping of REG bundles may use interleaving or non-interleaving mappings. In the non-interleaving mapping, consecutive REG bundles (e.g., adjacent in frequency) may form a CCE and CCEs adjacent in frequency may form a PDCCH. In the interleaving mapping, REGs may be interleaved (or permuted) before being mapped to CCEs, resulting in (i.e., generally) non-adjacent REG bundles in one CCE and non-adjacent CCEs in one PDCCH.

A Control Resource Set (CORESET) may be configured by or may comprise at least one of: a frequency assignment (e.g., as chunks of 6 RBs); a length in time (e.g., 1-3 OFDM symbols); a type of REG bundle; and/or, a type of mapping from REG bundles to CCEs (e.g., whether it is interleaving or non-interleaving). In a (e.g., each) bandwidth part (BWP), there may be up to N (e.g., 3) CORESETs. For example, there may be 12 CORESETs in 4 possible BWPs.

A WTRU may monitor or may be assigned a set of PDCCH candidates (e.g., to monitor). A set of PDCCH candidates may be monitored during the blind detection of PDCCH. A search space or a set of search spaces (e.g., for multiple ALs) may be or may include a set of PDCCH candidates (e.g., to monitor, such as with blind detection). A (e.g., each) search space or set of search spaces may be configured by at least one of: an associated CORESET; a number of candidates for or within each AL; and/or, a set of monitoring occasions. The monitoring occasions may be determined by one or more of a monitoring periodicity (e.g., in terms of slots), a monitoring offset, and/or a monitoring pattern (e.g., with 14 bits corresponding to the possible patterns of symbols inside a slot).

Figure 4:
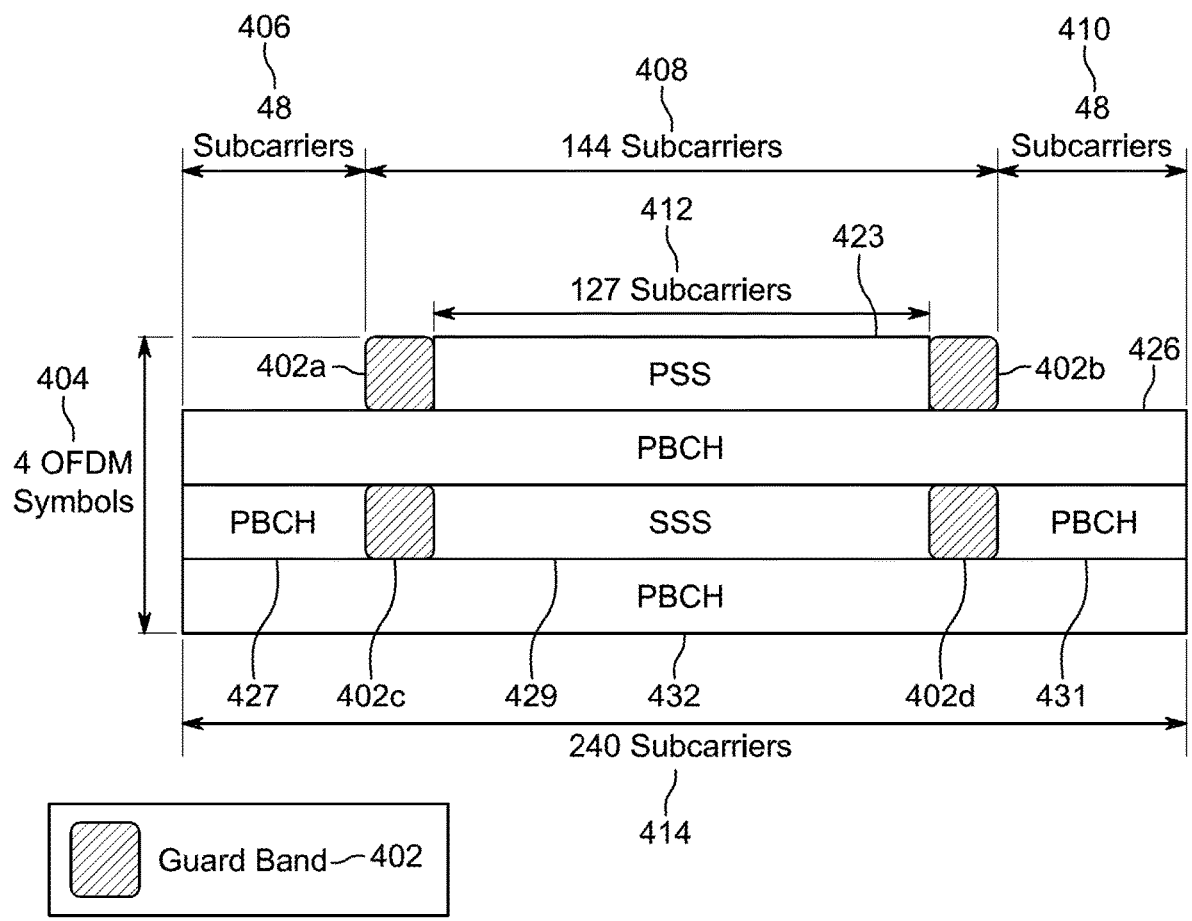
FIG. 4 illustrates an example of a structure of a synchronization signal (SS)/physical broadcast channel (PBCH) block.

FIG. 4 illustrates an example structure of a synchronization signal (SS)/physical broadcast channel (PBCH) block. A SS/PBCH block may be referred to herein as an SSB. An SSB may be composed of a number of symbols (e.g., 4 OFCM symbols 404). An SSB may contain at least one of a Primary Synchronization Signal (PSS) 423, a Secondary Synchronization Signal (SSS) 429, and a Physical Broadcast Access Channel (PBCH) (e.g., 426, 427, 431, or 432). One or more of the PSS, SSS, and PBCH may be repeated in the block, as shown. An SS burst may contain a configured number of L SSBs, where an SSB may correspond to a beam. An SS burst and SS/PBCH period may be used interchangeably herein. An SS/PBCH period may be a half frame. A half frame may be 5 ms. There may be guard bands 402 between a PBCH and an SSS (e.g., PBCH 427, guard band 402c, then SSS 429). A PSS or SSS may be a certain number of subcarriers (e.g., 144 subcarriers as shown at 412). A PBCH may be a different number of subcarriers depending on its placement (e.g., PBCH 427 may be 48 subcarriers as shown at 406, PBCH 431 may be 48 subcarriers as shown at 410, and PBCH 432 may be 240 subcarriers as shown at 414).

In some NR cases, a WUS or GOS may not be supported. In such a case, a WTRU may monitor PDCCH in associated search spaces except when the WTRU is in an OFF duration in a DRX cycle and/or not in Active Time. This may result in higher power consumption although there is no PDCCH to receive. To address this issue, an energy saving signal (ESS) may be used. An ESS may also be known as a power saving signal. As discussed herein, an ESS may be interchangeable with a WUS or GOS. Additionally, an ESS may be a WUS, GOS, or both.

There may be one or more types of ESSs. A first ESS type may be based on a preamble, or a sequence, and a second ESS type may be based on a downlink control channel (e.g., PDCCH).

A first ESS type may be used to wake up a WTRU for monitoring PDCCH. The ESS (e.g., first ESS type ESS) may be a signaled (e.g., synchronization signal) for time and/or frequency tracking.

A second ESS type may also be used to wake up a WTRU for monitoring PDCCH when the WTRU may not need to perform time/frequency tracking from the ESS. For example, for a second ESS type, one or more PDCCH candidates may be reserved, used, and/or monitored. In another example, for a second ESS type one or more CCEs in a search space may be reserved, used, and/or monitored.

A WTRU may determine an ESS type to monitor based on one or more conditions, such as a sleep time, the availability of a search space, a higher layer configuration, a DRX cycle, an RRC status, and/or a search space type associated with the ESS type.

For a sleep time condition, a sleep timer may be used and if the sleep timer expires (e.g., sleep time is longer than a threshold), a WTRU may determine to monitor a first ESS type in an associated ESS resources; otherwise the WTRU may determine to monitor a second ESS type in an associated ESS resource. The threshold may be based on WTRU capability.

For a condition of availability of a search space for an ESS type (e.g., a second ESS type), if a search space for a second ESS type is available in a slot for ESS monitoring, the WTRU may monitor the second ESS type; otherwise, the WTRU may monitor a first ESS type in an associated ESS resource.

For a DRX cycle condition, if a WTRU is in a short DRX cycle, the WTRU may monitor a second ESS type; if a WTRU is in a long DRX cycle, the WTRU may monitor a first ESS type.

For an RRC status condition, if a WTRU is in RRC connected mode, the WTRU may monitor a second ESS type; if a WTRU is in RRC idle, or RRC inactive, the WTRU may monitor a first ESS type.

For a search space type associated with the ESS condition, if an associated search space for an ESS is a first search space type (e.g., common search space), a WTRU may monitor a first ESS type. If an associated search space for an ESS is a second search space type (e.g., WTRU-specific search space), a WTRU may monitor a second ESS type.

In an approach, a sequence with one or more cyclic shift values may be used for an ESS. Whether the ESS is WUS or GOS may be determined based on a cyclic shift value. For example, a same sequence may be used with one or more cyclic shift (CS) values or indexes and a (e.g., each) CS index may indicate WUS or GOS. As discussed herein, a sequence, base sequence, Zadoff-Chu sequence, m-sequence, gold sequence, and Golay sequence may be used interchangeably.

In one case, a first CS of a sequence may be or may correspond to a WUS and a second CS of a sequence may be or may correspond to a GOS. For this case, a pair of CS values may be predefined or configured. The first CS value may be defined, configured, or otherwise known and the second CS may have a fixed offset (e.g., 6) from the first CS value within a set of CS values (e.g., {0, 1, 2, 3, 4, 5, 6, 7, 8, 9, 10, 11}). The set may be considered in a circular or modulo manner such that the beginning of the set repeats after the end of the set. For this scenario a single CS or a pair of CS values may be configured in a WTRU-specific manner. A WTRU may be configured with a CS value or a pair of CS values as an ESS. For this scenario if a single CS value is configured, the ESS may be used as one of WUS and GOS. Which one to use (e.g., WUS or GOS) may be configured by the gNB or determined based on associated search space type.

In one scenario, when a WTRU receives a WUS, the WTRU may perform one or more actions. In one action, the WTRU may start monitoring PDCCHs in the associated search spaces from time (e.g., slot) n+k1, when the WTRU received the WUS in time (e.g., slot) n. In this action, one or more of the following may apply: the k1 value may be predetermined (e.g., a fixed value k1=4 or 0); the k1 value may be configured by a higher layer signaling; the k1 value may be determined based on at least one of subcarrier spacing, a number of RBs configured for the associated bandwidth part (e.g., active BWP), and/or a center frequency (e.g., FR1 or FR2); the k1 value may be determined based on ESS type; n and/or n+k1 may correspond to a slot, a symbol, a set of symbols, a mini-slot, and/or a subframe; and/or the n and/or k1 values may be based on or in terms of a number of symbols, slots, mini-slots, and/or subframes. Regarding FR1 and FR2, FR1 may be used when the center frequency of the cell is below 6 GHz and FR2 may be used when the center frequency of the cell is higher than 6 GHz.

In another action the WTRU may perform after receiving a WUS, the WTRU may start monitoring PDCCHs in a subset of search spaces configured, for example, in the search spaces associated with the WUS, where one or more WUSs may be used and a (e.g., each) WUS may be associated with a set of search spaces.

In another scenario, when a WTRU receives a GOS, the WTRU may perform one or more actions. In one action the WTRU may skip monitoring PDCCHs in the associated search spaces from time (e.g., slot) n+k2, when the WTRU receives the GOS in time (e.g., slot) n. In this action, one or more of the following may apply: the k2 value may be predetermined (e.g., fixed value k2=0); the k2 value may be configured by a higher layer signaling; the k2 value may be determined based on at least one of subcarrier spacing, a number of RBs configured for the associated bandwidth part (e.g., active BWP), and/or a center frequency (e.g., FR1 or FR2); the k2 value may be determined based on ESS type; n and/or n+k2 may correspond to a slot, a symbol, a set of symbols, a mini-slot, and/or a subframe; and/or, the n and/or k2 values may be based on or in terms of a number of symbols, slots, mini-slots, and/or subframes. Regarding FR1 and FR2, FR1 may be used when the center frequency of the cell is below 6 GHz and FR2 may be used when the center frequency of the cell is higher than 6 GHz.

In another action the WTRU may stop or skip measuring one or more reference signals (e.g., for CSI or radio resource management (RRM)) configured to be measured in the associated time window (e.g., associated PDCCH monitoring occasions), for at least some specified time.

In another action, the WTRU may stop or skip performing time/frequency tracking, for at least some specified time.

For the above scenarios, k1 and k2 values may be difference (e.g., k1=4 and k2=0).

Figure 5:
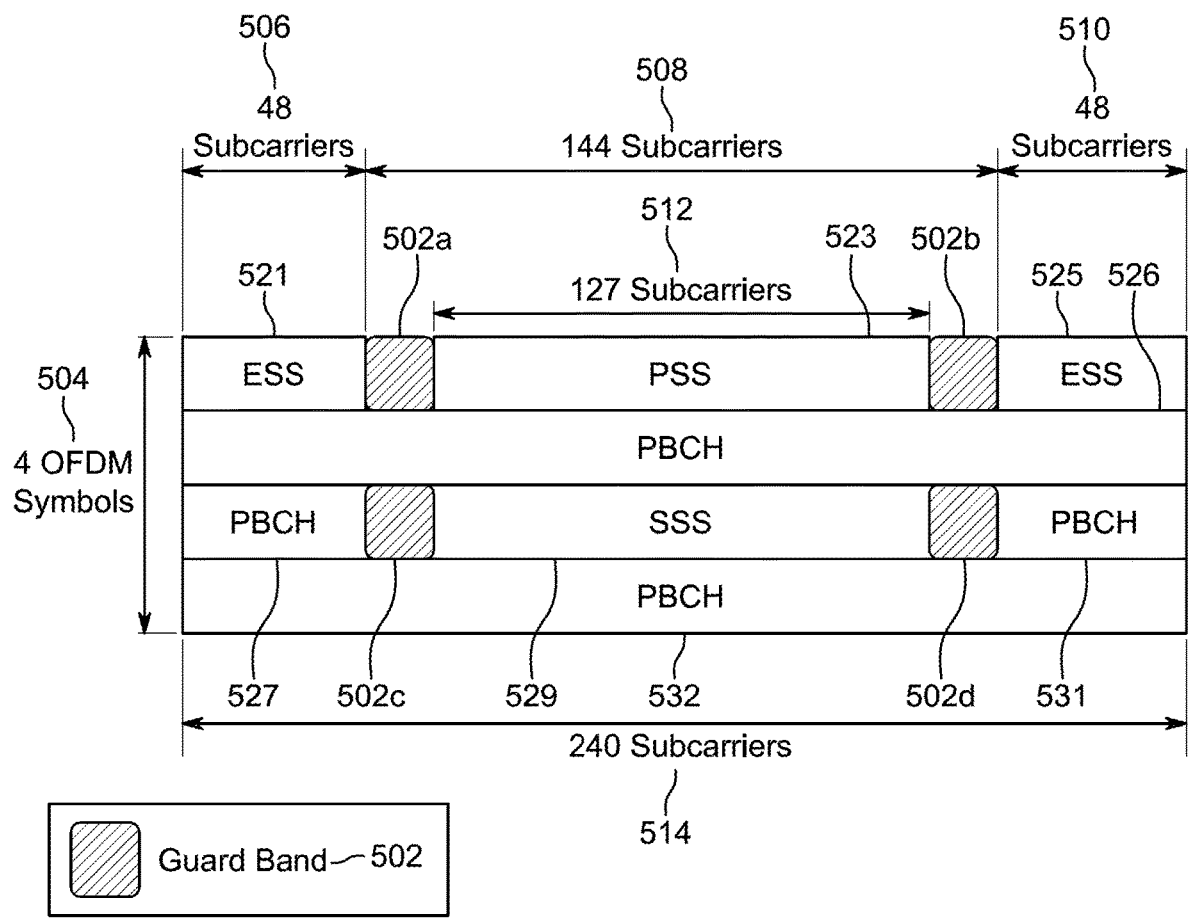
FIG. 5 illustrates an example of WUS within SS/PBCH block resource.

FIG. 5 illustrates an example of an ESS (e.g., WUS) within an SS/PBCH block resource. A WTRU, such as a WTRU without a power saving mode (PSM) capability, may assume that the non-used subcarriers around PSS may be zero. The subcarriers around the PSS may be used for an ESS for another WTRU, such as a WTRU with a PSM capability. As shown, the subcarrier locations within the SSB block that are not used for SSB signals may be used for transmission of ESS (e.g., 521 and 525). FIG. 5 is similar to FIG. 4 in its presentation of elements, so like numbered elements may be understood to be the same (e.g., PBCH 427=PBCH 527), except for reference to the ESS elements 521 and 525. As discussed herein, SSB, SSB block and SS/PBCH block may be used interchangeably.

In the example of FIG. 5, at least some portion (e.g., all) of an ESS or ESS content may be mapped to one or more subcarrier locations around a PSS (e.g., of one or more SSBs).

A WTRU may detect the presence of an ESS by demodulation and processing of one or more of the subcarriers around the PSS signal.

One or more SSBs (e.g., each SSB), for example within an SS burst, may carry (e.g., repeat) the same ESS or ESS content. Alternatively, the ESS may be split into multiple segments and/or may be spread or distributed over more than one SSB, for example within an SS burst.

A ESS may be in a form of a coded information payload or a sequence, or a combination thereof. An ESS, such as a WUS, may indicate a wake-up period, a start or beginning of a wake-up period, or a start or beginning of an upcoming wake-up period during which a WTRU may monitor PDCCH or PDCCH occasions. For example, a WTRU may determine the presence of a WUS and then determine, based on the WUS (e.g., based on a property of the WUS, a configuration associated with the WUS, and/or reception of the WUS), information about a CORESET and/or a search space.

A ESS may be WTRU specific or group specific.

If a ESS indication is provided through transmission of a coded payload, then a WTRU may determine the presence of an ESS if the decoded payload matches an assigned RNTI (e.g., C-RNTI). Alternatively, a WTRU may determine the presence of a ESS by descrambling the CRC using an assigned RNTI (e.g., C-RNTI). For instance, a PS-RNTI may be used to address WTRUs configured in a power saving mode.

If a ESS indication is provided through transmission of a sequence, a WTRU may be configured with one or more sequence indices, such as a sequence family with low correlation properties (i.e., m-sequence, ZC may be used as ESS). A sequence may be split in to two parts and each part may be mapped to subcarrier locations around a PSS. In an example, a sequence with length 96 may be split and mapped on subcarrier locations around PSS. Alternatively, two sequences with length 48 may be used for ESS indication (e.g., as shown in FIG. 5). The sequence mapped on each side may be the same or different. A WTRU may determine an ESS indication based on the combination of the indices corresponding to the two sequences.

In case of a group specific indication, the wake-up process may be implemented in multiple steps, where in the first step a sub-set of WTRUs may be addressed, and in the remaining steps specific WTRUs may be indicated. For example, a first ESS or a first part of an ESS may be group specific (i.e., group common) and a second ESS or a second part of an ESS may be WTRU specific. In another example, the first ESS or first part of the ESS may be specific to a first group of WTRUs and the second ESS or the second part of the ESS may be specific to a second group of WTRUs where the second group may be a subset of the first group.

In some cases, an ESS may comprise at least two parts where at least one part may indicate a group ID representative of a group of WTRUs while at least one other part may indicate a WTRU ID for a WTRU within the group of WTRUs. For example, a sequence may identify a group where the group may be encoded within at least one of the root of a sequence, cyclic shift of a sequence, or index of a sequence scrambling another sequence. A WTRU may identify the group ID after detecting the associated quantity (e.g., root, cyclic shift, or sequence index). At least one part of the ESS may indicate the WTRU ID within the detected group. The WTRU ID may be carried in a payload, or as another sequence specific quantity (e.g., root, cyclic shift, sequence index). In one example, an ESS may comprise a ZC sequence scrambled with another sequence. In such a case, at least one of the following may apply: the root of the ZC sequence may be associated with a cell ID; the cyclic shift of the ZC sequence may be associated with a group ID or WTRU ID; and/or, the index of a scrambling sequence scrambling the ZC sequence may be associated with a WTRU ID or group ID.

In one approach, an ESS may be indicated through a PBCH DMRS. In NR with L maximum number of SS/PBCH blocks or beams in an SS/PBCH period, the reference-signal sequence for an SS/PBCH block may defined by the following equation:

$$r(m) = \frac{1}{\sqrt{2}}(1 - 2 \cdot c(2m)) + j\frac{1}{\sqrt{2}}(1 - 2 \cdot c(2m+1))$$

Where c(m) may the scrambling sequence generator. The scrambling sequence may be initialized at the start of each SS/PBCH block occasion with the following equation:

$$c_{init}=2^{11}(\bar{i}_{SSB}+1)(\lfloor N_{ID}^{cell}/4 \rfloor+1)+2^{6}(\bar{i}_{SSB}+1)+(N_{ID}^{cell} \mod 4)$$

Where $\bar{i}_{SSB}$ is two and three least significant bits of SS/PBCH block index for L=4 and L=8, respectively.

In one instance, a WTRU (e.g., a PSM-capable WTRU) may be configured to use a reference signal with one or more $i_{SSB}$ values as an ESS or an indication of ESS. For example, a WTRU (e.g., PSM-capable WTRU) may use or consider one or more SS/PBCH blocks in an SS/PBCH period as an ESS or indicating an ESS. A WTRU (e.g., a PSM-capable WTRU) may use one or more $i_{SSB}$ values to indicate imminent or upcoming transmission of an ESS or a related control information (e.g., for PSM WTRUs). In one case, more than one $i_{SSB}$ values may be used for a single (i.e., same) beam (e.g., physical beam or beam direction).

Figure 6:
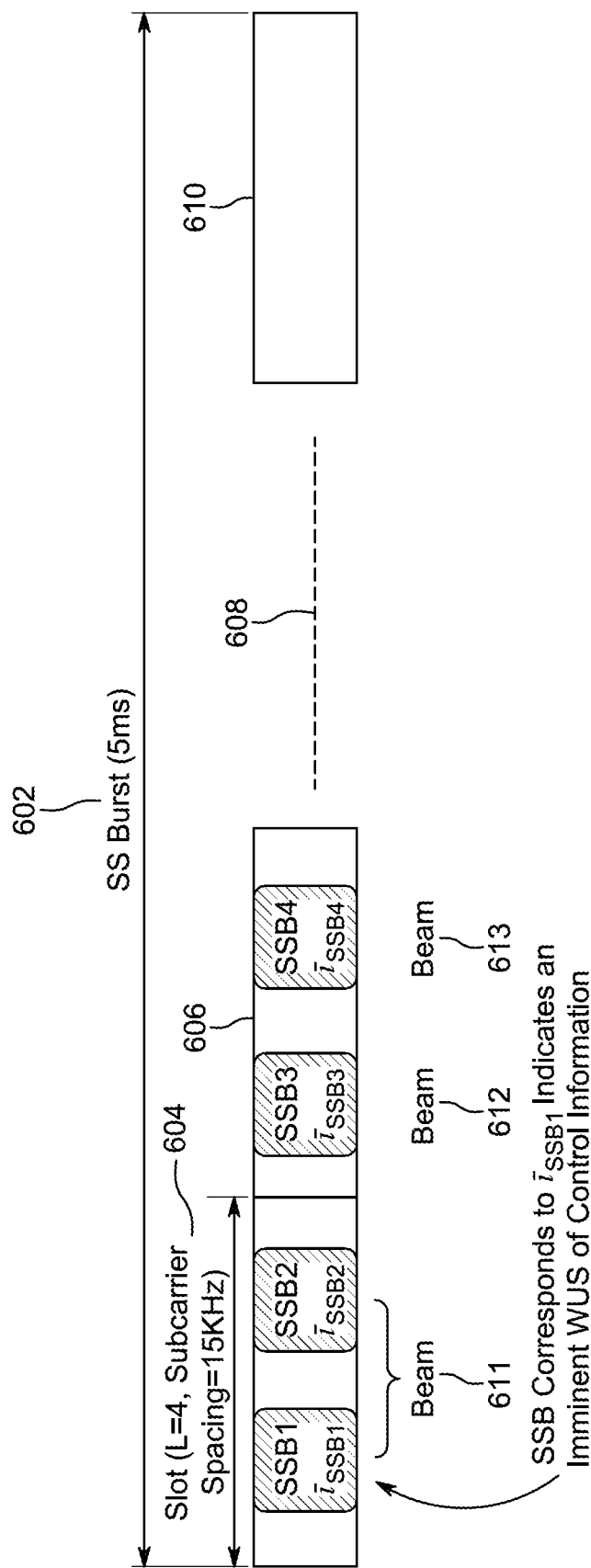
FIG. 6 illustrates an example of two different $\bar{i}_{SSB}$ values are assigned to a same beam where $\bar{i}_{SSB1}$ may indicate an imminent or upcoming WUS.

FIG. 6 illustrates an example of an SS burst. Generally, an SS burst 602 may have a duration of 5 ms. Also, in the SS burst 602 there may be a number of slots (e.g., 604, 606, and 610, where 608 is a gap which may represent one or more other slots not shown for the sake of the illustration), where each slot may have a subcarrier spacing of 15 KHz as shown at 604. Here, two different $i_{SSB}$ values (e.g., SSB1 and SSB2) are assigned to one (i.e., the same) beam 611 where $\bar{i}_{SSB1}$ may indicate an imminent or upcoming ESS.

In an example, some SSBs may not be transmitted. The gNB may indicate via signaling which SSBs are actually transmitted. For an SSB that is not actually transmitted, the DMRS that may ordinarily be transmitted with the PBCH of the SSB may (e.g., may still) be transmitted. The DMRS may be used as an ESS or to indicate an ESS. A DMRS with an $\bar{i}_{SSB}$ of an SSB that may not be transmitted may be used as an ESS or as an indication of an ESS. A WTRU may be configured with the indices of one or more SSBs that may be used as a ESS or to indicate a ESS. The WTRU may use an index of an SSB to determine a time to monitor for a signal (e.g., a DMRS, that may be a ESS or may indicate a ESS).

When a WTRU receives an ESS, such as a WUS or an indication of a WUS, the WTRU may wake-up (e.g., monitor or begin monitoring for PDCCH or PDCCH occasions).

If a WTRU misses an ESS, for example due to a poor channel condition, the WTRU may also miss a subsequent grant transmitted from a gNB via a PDCCH. The WTRU may miss the grant although the WTRU may be able to receive the PDCCH, for example since the PDCCH coverage may be better than the ESS coverage. Therefore, a WTRU may continue to sleep and a gNB may not be able to reach the WTRU due to the misdetection of ESS. One approach to address this issue may be for the WTRU to determine a reliability level of an ESS (e.g., WUS), for example based on the signal strength or measurement quality of the ESS. The WTRU may determine whether or not to use an ESS based on the determined reliability of the ESS.

For example, a WTRU may measure or determine a signal strength (e.g., RSRP) of an ESS. If the signal strength of an ESS is below a threshold, the WTRU may ignore the ESS (e.g., WUS) or assume the WUS to be present and monitor PDCCH in the associated search space. The WTRU may monitor PDCCH according to a DRX cycle (e.g., a regular or legacy DRX cycle) that may be independent of the ESS. As discussed herein, a signal strength, a signal energy level, an L1-RSRP level, a SINR level, a measurement level, and a measurement quality may be interchangeably used.

Figure 7:
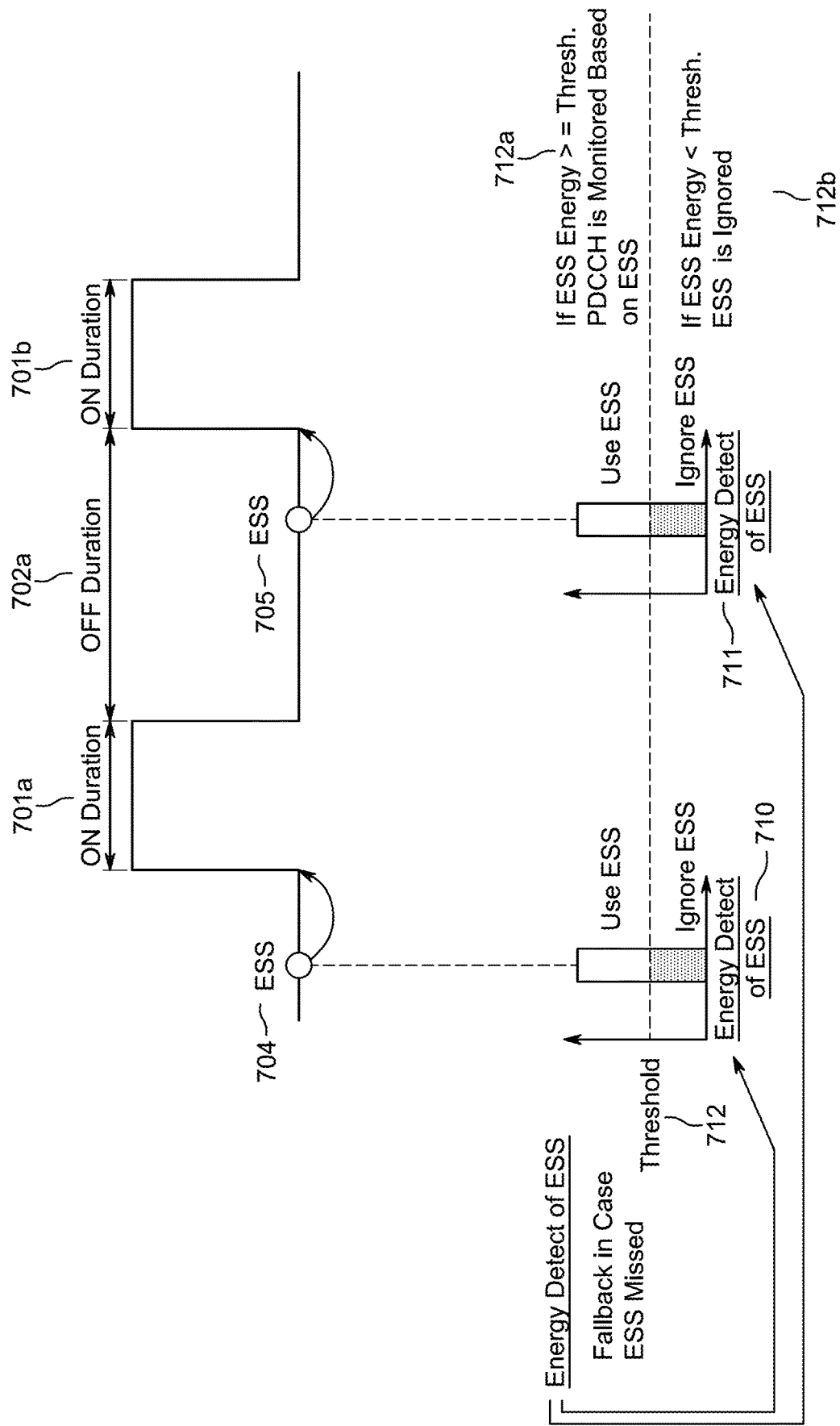
FIG. 7 illustrates an example of detecting the energy of a potential ESS.

FIG. 7 illustrates an example of monitoring for an ESS and assessing the associated signal strength. A WTRU may monitor or attempt to receive or decode an ESS (e.g., WUS 704). If the signal strength 710 of the ESS is higher 712a than a threshold 712 and the ESS is a WUS or indicates to wake-up or monitor PDCCH, the WTRU may wake up, continue to be awake, and/or monitor PDCCH in the associated search spaces. If the signal strength of the ESS is lower 712b than the threshold 712, the WTRU may ignore the ESS, continue with a default operation of the WTRU (e.g., remain asleep or wake up with a DRX cycle and monitor PDCCH in the associated search spaces). Wake-up and/or monitoring may begin at the start of the DRX cycle (e.g., at the start of the ON duration 701a) that follows the ESS measurement or ESS (e.g., WUS) detection.

A WTRU may monitor or attempt to receive or decode an ESS (e.g., a GOS). If the signal strength of the ESS is higher than a threshold and the ESS is a GOS or indicates to skip PDCCH monitoring, the WTRU may go to sleep, continue to sleep, and/or skip monitoring PDCCH in the associated search spaces. If the signal strength of the ESS is lower than the threshold, the WTRU may ignore the ESS and wake up, continue to be awake, and/or monitor PDCCH in the associated search spaces. Sleep and/or skipping monitoring may begin immediately or at the next PDCCH monitoring occasion. Wake-up and/or monitoring may begin immediately, at the next PDCCH monitoring occasion, or at the start of the DRX cycle (e.g., at the start of the ON duration) that follows the ESS measurement.

Generally, a WTRU may monitor for an ESS (e.g., WUS and/or a GOS), where the signal strength of ESS may indicate whether the WTRU may or may need to monitor the associated PDCCH or skip monitoring the associated PDCCH. For example, if the signal strength of an ESS (e.g., WUS) is higher than a threshold, it may mean that a WTRU needs to monitor the associated PDCCH. If the signal strength of an ESS (e.g., WUS) is lower than a threshold, it may mean that a WTRU may skip monitoring the associated PDCCH.

A WTRU may monitor PDCCH in the associated search space if the signal strength of WUS is higher than a threshold and/or the signal strength of GOS is lower than the threshold.

A WTRU may skip monitoring PDCCH in the associated search space if the signal strength of WUS is lower than a threshold and/or the signal strength of GOS is higher than the threshold.

A WTRU may monitor PDCCH in the associated search space if the signal strength of WUS and the signal strength of GOS are both higher than a threshold or both lower than the threshold. A WTRU may expect that a gNB sends an ESS, or one (e.g., only one) of a WUS and a GOS (e.g., at a time). When both WUS and GOS have a signal strength higher than a threshold, the WTRU may consider it as an error case.

The thresholds for WUS and GOS may be configured separately or independently. The threshold for WUS may be lower than the threshold for GOS.

As discussed herein, one or more of the threshold values may be used and at least one threshold value may be determined based on a WTRU coverage level.

In one approach, the use of an ESS (e.g., WUS and/or GOS) may be determined based on WTRU coverage level or WTRU measurement of a signal (e.g., a DL signal) other than the ESS. For example, if a downlink measurement (e.g., L1-RSRP, RSRP, pathloss, CQI, RRM measurement quality, beam measurement quality) is lower than a threshold, the WTRU may ignore a configured ESS. The measurement may be of a reference signal such as PSS, SSS, CSI-RS or a DMRS (e.g., PBCH DMRS). When the WTRU ignores an ESS the WTRU may follow a DRX cycle (e.g., sleep and wake) without consideration for the ESS (e.g., presence or lack of presence of the ESS), and the WTRU may monitor PDCCH (e.g., in the associated search spaces) according to the DRX cycle. Alternatively, When the WTRU ignores an ESS, since the WTRU may rely on this signal, the WTRU may remain asleep in order to save energy.

If the downlink measurement (e.g., of a signal other than the ESS) is higher than the threshold, the WTRU may monitor or skip monitoring PDCCH (e.g., the associated PDCCH) based on WUS and/or GOS detection. One or more ESSs may be configured. An (e.g., each ESS) ESS may have an associated measurement reference signal. If a quality of the measurement reference signal is lower than a threshold, the WTRU may ignore the associated ESS or skip decoding the associated ESS. The downlink measurement reference signal may be a beam quality measurement reference signal associated with one or more CORESETs In an approach, an acknowledgment (ACK) for a corresponding ESS (e.g., WUS/GOS) may be transmitted or reported from a WTRU. For example, a WTRU may send an ACK for a corresponding WUS if the WTRU received the WUS. The ACK may be sent so the gNB may be informed whether the WTRU missed the WUS or received the WUS.

A WTRU may send an ACK when the WTRU receives a WUS. The WTRU may not send an ACK when the WTRU receives a GOS. A PUCCH resource may be used for ACK transmission. A WTRU may send an ACK to indicate the reception of WUS when (e.g., only when) an associated PUCCH resource is configured.

In an approach, an ESS (e.g., WUS/GOS) may be transmitted with an associated DMRS. A WTRU may estimate a channel with the associated DMRS and demodulate data to detect the ESS. If the signal strength of the associated DMRS is lower than a threshold, the WTRU may skip demodulating the associated data and monitor PDCCH in the associated search space. The DMRS sequence may be scrambled with an ID to indicate whether the ESS is for WUS or GOS. The data may include information related to a start time or a time window during which a WTRU may or may need to monitor PDCCH or a start time or time window during which the WTRU may skip monitoring PDCCH.

Figure 8:
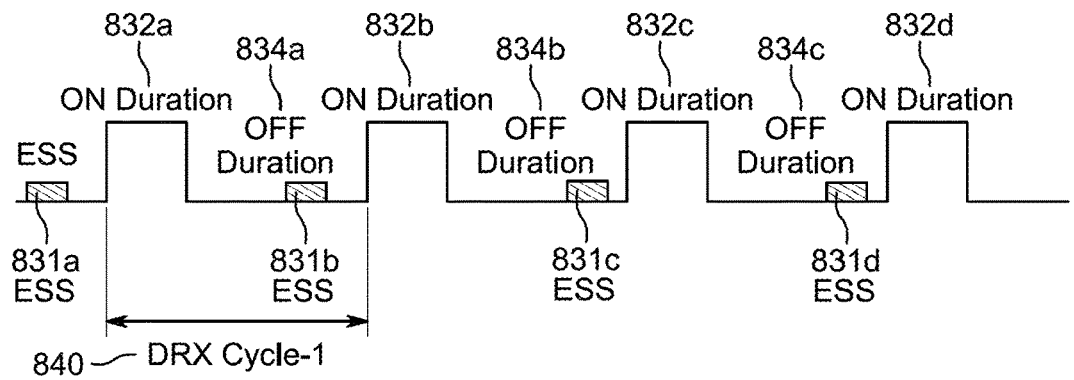
FIG. 8 illustrates an example of DRX cycles with and without associate to ESS.
Figure 8:
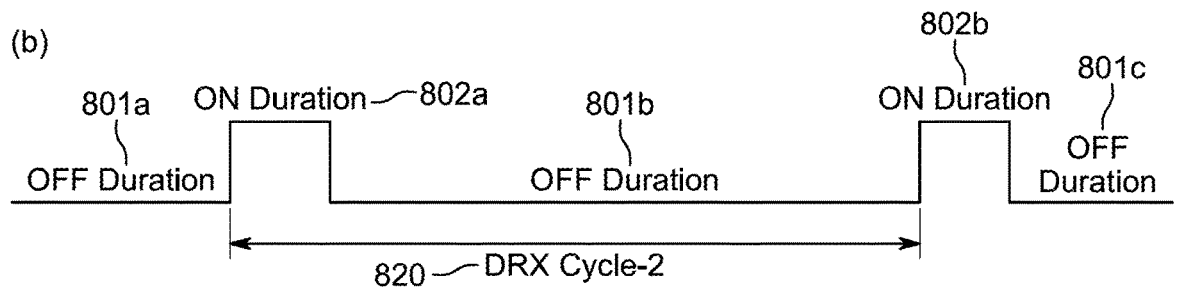

FIG. 8 illustrates an example of DRX cycles with and without an associated ESS. Generally, a WTRU may be configured with two or more DRX cycles and at least one of the DRX cycles may be associated with, or use, an ESS. The WTRU may be configured with a first DRX cycle 840, DRX cycle-1 (e.g., a short DRX cycle) and a second DRX cycle 820, DRX cycle-2 (e.g., a long DRX cycle). PDCCH monitoring for the first DRX cycle 840 (e.g., during the ON duration 832a and/or Active Time of the first DRX cycle) may be controlled by or based on an ESS 831a (e.g., based on receipt or detection of an ESS). For example, the WTRU may monitor (e.g., only monitor) the PDCCH (e.g., during the first DRX cycle 740 or during an ON duration 832a or Active Time of the first DRX cycle 840) if the WTRU detects an ESS 831a (e.g., for, prior to, or within a threshold time prior to the start or ON duration 832a of the first DRX cycle 840). PDCCH monitoring for the second DRX cycle 820 (e.g., during the ON duration 802a and/or Active Time of the second DRX cycle 820) may be performed regardless of whether or not an ESS is present or detected (e.g., for, prior to, or within a threshold time prior to the start or ON duration of the second DRX cycle); accordingly, an ESS is not shown prior to the second DRX cycle 820 unlike the first DRX cycle 820.

In another example, the first DRX cycle may be a long DRX cycle and the second DRX cycle may be a short DRX cycle or the first DRX cycle may be longer than the second DRX cycle. The WTRU may use an ESS for determining when to monitor PDCCH for a long DRX cycle and may not use an ESS for determining when to monitor PDCCH. In another example, a WTRU may use an ESS for determining when to monitor PDCCH based on the length of a DRX cycle. For instance, if a DRX cycle is greater than, or less than, a threshold. A WTRU may, or may not, use an ESS for determining when to monitor PDCCH. When to monitor PDCCH may be the same as on what PDCCH occasions to monitor PDCCH.

Use of ESS to determine when to monitor PDCCH may be based on a timer or configuration. A timer may be defined (e.g., slotswithoutESS) where the timer may be used to count the amount of time an ESS is not detected. For example, the timer may be activated when an ESS is detected and may count the number of slots or symbols or a comparable quantity until another ESS is detected. If the timer exceeds a threshold and another ESS has not been detected, the WTRU may activate PDCCH monitoring during the ON duration of one or more DRX cycles, for example regardless of ESS detection (e.g., subsequent ESS detection) status. The WTRU may monitor PDCCH during an (e.g., one) ON duration (e.g., the first ON duration) after the timer exceeds the threshold. The WTRU may monitor PDCCH during N (e.g., multiple) ON durations after the timer exceeds the threshold. The value of N may be configured. The WTRU may monitor PDCCH during ON durations (e.g., all ON durations) until a signal (e.g., GOS) or configuration is received that indicates to stop monitoring PDCCH or indicates to monitor for ESS and/or consider ESS status when determining the PDCCH occasions to monitor. The WTRU may indicate ESS detection failure (e.g., to the gNB).

Figure 9:
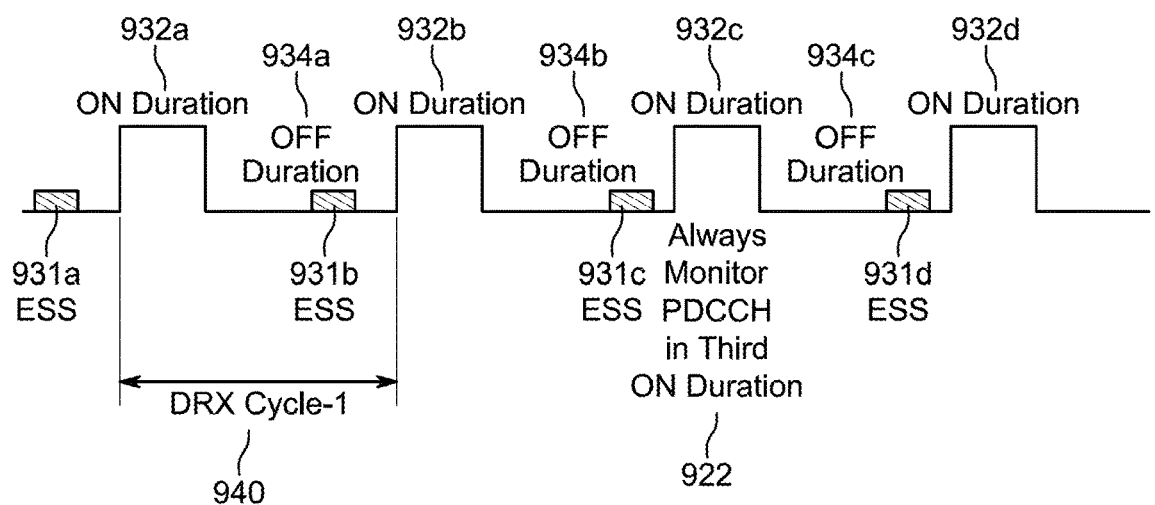
FIG. 9 illustrates an example of PDCCH monitoring patterns with ESS.

FIG. 9 illustrates an example where a WTRU may monitor a PDCCH regardless of ESS. Generally, a WTRU may monitor PDCCH during certain ON durations of a DRX cycle regardless of the ESS status associated with those ON durations. FIG. 9 may be similar to the short DRX cycle shown in (a) of FIG. 8 (e.g., like numbered elements may be similar, such as ON Duration 832a=ON Duration 932a). As shown at 922, the WTRU may monitor the PDCCH during the 3rd ON duration whether an ESS is transmitted/detected or not. The ON durations to monitor PDCCH regardless of ESS status may be configured; for example, the configuration may be periodic or follow a pattern.

In some cases, a single coverage level may be supported for an ESS, such as a WUS, and the ESS may support a maximum coverage level in a cell, which may consume a maximum amount of resources needed for ESS transmission. However, in some instances (e.g., NR), the ESS may be used in a WTRU-specific manner and each WTRU may have a different coverage level. Therefore, using an ESS with a single coverage level may result in unnecessary resource waste. In one approach to address this issue one or more coverage levels, which may be interchangeable with coverage extension or enhancement (CE) levels, may be supported for an ESS (e.g., WUS/GOS). The CE level for an ESS may be selected, determined, or used in a WTRU-specific manner or a WTRU-group specific manner.

A CE level (e.g., of an ESS) may be at least one of a repetition number (e.g., a number of repetitions of the ESS or the number of times the ESS is repeated), an aggregation level (AL), a sequence length, a subcarrier spacing, and/or a number of preambles or sequences (e.g., of the ESS).

A CE level (e.g., of an ESS) may be determined based on at least one of a repetition number (e.g., a number of repetitions of the ESS or the number of times the ESS is repeated), an aggregation level (AL), a sequence length, a subcarrier spacing, and/or a number of preambles or sequences (e.g., of an ESS or of PDCCH search space such as an associated PDCCH search space).

A repetition number (e.g., a number of repetitions or the number of times repeated) of an ESS or a PDCCH may be determined or used, for example, based on or according to the CE level of the ESS. If an ESS is based on a preamble, or a sequence, the preamble or sequence may be repetitively transmitted over one or more symbols, slots, and/or sub-frames. If an ESS is based on PDCCH, the PDCCH may be repetitively transmitted or received over one or more slots or sub-slots. A higher CE level of an ESS may have a higher repetition number (e.g., for the ESS). For example, a CE level 2 may have a higher repetition number than a CE level 1. A CE level 0 may be no repetition.

An aggregation level (AL) of an ESS may be determined or used, for example, based on or according to the CE level of the ESS. The CE level of an ESS may be the AL of the ESS or may be determined based on an AL of the ESS. An ESS may be transmitted or signaled over one or more ESS resource units, wherein an ESS resource unit may be at least one of following: a REG; a REG-bundle; a REG of PDCCH; an RE; an RB; a symbol; a symbol; a subframe; and/or, a frame. If an ESS is transmitted over $N_{AL}$ ESS resource units, it may be referred to as an ESS aggregation level (AL) $N_{AL}$. The ESS CE level may be determined based on or may correspond to the ESS AL. The ESS AL may be determined based on or may correspond to the ESS CE level.

A sequence length of an ESS may be determined or used, for example, based on the CE level of the ESS. One or more sequence lengths may be used for an ESS and a higher ESS CE level may have a longer sequence length.

A subcarrier spacing (e.g., of an ESS) may be determined or used, for example based on the CE level of the ESS. A smaller subcarrier spacing may be used (e.g., for an ESS) for a higher ESS CE level (e.g., worse coverage or more coverage extension or enhancement).

A number of preambles, or sequences, used (e.g., for an ESS) may be determined or used, for example, based on the CE level of the ESS. An ESS may contain a set of sequences and the number of sequences used for an ESS may be determined based on a CE level of the ESS. Alternatively, the CE level may be determined based on or may be a function of the number of sequences used. A larger number of sequences for an ESS may be used for a higher CE level.

FIG. 10 illustrates an example of determining ESS (e.g., WUS and/or GOS) CE level based on the maximum PDCCH AL configured for the associated search space as according to one or more techniques described herein. As discussed above, which CE level (e.g., which AL, which repetition number, which sequence length, which subcarrier spacing, which number of sequences, etc.) to use for an ESS (e.g., WUS/GOS) may be determined based on a PDCCH AL (e.g., a maximum PDCCH AL, average PDCCH AL, or a minimum PDCCH AL) configured or used for an associated search space(s).

For example, a WTRU may determine the CE level of an ESS based on a maximum PDCCH AL configured within the associated search spaces. In another example, a WTRU may determine the CE level of an ESS based on a maximum PDCCH AL in all configured search spaces for a WTRU-specific search space, common search space, or both.

In one example, a WTRU may monitor for an ESS prior to a discontinuous reception (DRX) ON duration that includes one or more search spaces for monitoring PDCCH. The WTRU may attempt to receive the ESS using a coverage enhancement (CE) level based on a parameter associated with the one or more search spaces, and on a condition that the ESS is successfully received, the WTRU may monitor for a PDCCH in a search space of the one or more search spaces in the ON duration using the parameter. In one instance, the parameter of the one or more search spaces may be the highest aggregation level (AL) of the one or more search spaces. In one instance, the CE level of the ESS may correspond to at least one of: a repetition number of the ESS; a number of sequences used for the ESS; the sequence length of the ESS, and/or an aggregation level (AL) of a DCI used for or associated with the ESS.

As shown in FIG. 10, there may be a DRX operation with ON Durations (e.g., 1001a and 1001b) and OFF Durations (e.g., 1002a). Prior to the first ON Duration 1001a, there may be an ESS (e.g., WUS) 1004 where the CE-level is 1. There may be one or search spaces for each ON Duration. During the first ON Duration 1001a SearchSpaceID=1 may have an AL of {2,4} and SearchSpaceID=2 may have AL of {1,2}. Prior to the second ON Duration 1001b, the WTRU may receive a second ESS (e.g., WUS) 1005 where the CE-level is 2. During the second ON Duration 1001b the SearchSpaceID=3 may have an AL of {2, 4, 8} and the SearchSpaceID=4 may have an AL of {2, 4}. Note that the CE level is based on need as shown since the ESS CE level may be determined based on the largest PDCCH AL of the SS in an associate ON Duration (e.g., for the first ON Duration 1001a the highest AL is 4 which may be associated with CE-level 1, and for the second ON Duration 1001b the highest AL is 8 which uses a comparatively higher CE-level of 2 since it is a larger AL compared to the highest AL of the first ON Duration 1001a). The gNB may set the search space ALs based on coverage, where the higher AL provides more coverage as shown at 1006. There may be a threshold value for the AL that may be used to determine the CE level of any given ESS. For example, the AL may be one of a set of ALs, such as {1, 2, 4, 8}. If the AL is less than the threshold (e.g., 4), a first CE level (e.g., CE-level-1) of an ESS may be used. Otherwise, a second CE level (e.g., CE-level-2) of an ESS may be used. Note that the ESS (i.e., WUS) may include number of ESS repetitions, number of sequences, and/or the ESS DCI AL. The gNB may set the search space AL based on coverage (i.e., CE), where a higher AL may provide more coverage.

Additionally, similar to the example of FIG. 7, the WTRU may use the detected energy to determine whether to process an ESS. There may be an energy threshold 1012 where if the WTRU detects the energy above that level, it may use the ESS as shown at 1012a. But if the WTRU determines that the energy is below the threshold, the ESS may be ignored as shown at 1012b. This is shown for both ESS instances (e.g., 1004 and 1005) with the WTRU determining whether the detected energy is above or below a threshold 1012 (e.g., at 1010 and 1011).

In one case a first and second PDCCH search space may be associated with an ESS and the first PDCCH search space may be configured with a first set of ALs (e.g., {2, 4}) and the second PDCCH search space may be configured with second set of ALs (e.g., {4, 8}). The CE level of the ESS may be determined based on the maximum AL (e.g., 8). The WTRU may monitor the ESS based on or using the determined CE level. The CE level of the ESS may be or may correspond to at least one of the highest AL, the number of repetitions, the sequence length, the number of sequences, and/or the subcarrier spacing of the ESS.

If one or more PDCCH candidates are reserved, allocated, determined, or used for an ESS, a single PDCCH AL may be used for an ESS (e.g., to minimize blind decoding complexity) and the PDCCH AL may be the same as the maximum PDCCH AL configured within the associated search spaces. Alternatively, the PDCCH AL for an ESS may be determined as a function of the maximum PDCCH AL configured within the associated search spaces. The function may, for example, be scaling based on the payload size of the ESS and the payload size of the DCI which may be monitored in the maximum PDCCH AL.

A sequence length of an ESS may be determined based on a maximum PDCCH AL configured for the associated search spaces. A short sequence (e.g., length 139 similar to a short PRACH sequence) may be used for the ESS if the maximum PDCCH AL configured for the associated search spaces is equal to or smaller than a threshold (e.g., AL=4). A long sequence (e.g., length 839 as similar to a long PRACH sequence) may be used for the ESS if the maximum PDCCH AL configured for the associated search spaces is larger than the threshold (e.g., AL=4). The threshold may be configured by a gNB.

A number of sequences used for an ESS may be determined based on the maximum PDCCH AL configured for the associated search spaces The association between a CE level of an ESS and a PDCCH AL (e.g., a maximum PDCCH AL) may be predefined, configured via a higher layer signaling, or broadcasted.

In one approach, a CE level of an ESS (e.g., WUS/GOS) may be determined based on a slot AL for an associated PDSCH and/or PUSCH (e.g., aggregationFactorDL, pdsch-AggregationFactor, and/or pusch-AggregationFactor). The slot AL may be configured per bandwidth part (BWP). The CE level of an ESS may be determined based on the slot AL configured in the active BWP, or associated BWP. A threshold value for the slot AL may be used to determine the CE level of an ESS. For example, the slot AL may be one of a set of ALs, such as {1, 2, 4, 8}. If the slot AL is less than a threshold (e.g., 4), a first CE level (e.g., CE-level-1) of an ESS may be used. Otherwise, a second CE level (e.g., CE-level-2) of an ESS may be used. There may be a one to one mapping between slot AL and CE level for an ESS. For example, a first CE level of an ESS may be used if a slot AL is a first value (e.g., 1); a second coverage level of ESS may be used if the slot AL is a second value (e.g., 2); a third coverage level of ESS may be used if the slot AL is a third value (e.g., 3); a fourth AL of ESS may be used if the slot AL is a fourth value (e.g., 4). The association between CE level of an ESS and a slot AL may be predefined, configured via a higher layer signaling, or broadcasted.

In one approach, a CE level of an ESS (e.g., WUS/GOS) may be determined based on the repetition number (e.g., maximum repetition number) of the associated search spaces. A set of repetition numbers may be configured for a search space, and a WTRU may attempt to decode all repetition numbers configured.

In some instances, an ESS (e.g., WUS/GOS) may be associated with a single search space. In some instances, an ESS may have multiple search spaces configured. In some instance, an ESS (e.g., WUS/GOS) may be associated with one or more search spaces. For example, Ns search spaces may be configured and a first subset of Ns search spaces may be associated with a first ESS, and a second subset of Ns search spaces may be associated with a second ESS.

A (e.g., each) search space configuration may include an associated ESS identity (i.e., ESS-id, WUS-id, and/or GOS-id), where a search space configuration or ESS identity have one or more of following associated configurations: a time/frequency location including BWP (e.g., BWP-id); a sequence length; a CE level (e.g., repetition number) or a set of CE levels; an association between CE level and maximum AL; periodicity and offset (e.g., slot number, subframe number); and/or, power level (e.g., power offset from associated SSB).

If a WTRU receives an ESS, such as a WUS, the WTRU may start monitoring the associated search spaces which may have the same ESS-id. If a WTRU receives a GOS, the WTRU may skip monitoring the associated search spaces. Each search space may be individually ON or OFF with a WUS/GOS.

A (e.g., each) ESS configuration may include one or more search space identities (e.g., SearchSpaceIDs). One or more ESS may be configured with a preamble, or a sequence, with a different cyclic shift. For example, a cyclic shift index may determine ESS-id. A set of search spaces may be indicated as active or inactive by a cyclic shift index of a preamble, wherein active or inactive may be indicated by an ESS. For example, if a WTRU receives a WUS, the WTRU may assume, or consider, that the associated set of search spaces is active; if a WTRU receives GOS, the WTRU may assume, or consider, that the associated set of search spaces is inactive. A WTRU may monitor an active search space (e.g., for PDCCH) during the ON Duration and/or Active Time of a DRX cycle. A WTRU may not monitor an active search space during the OFF Duration of a DRX cycle when it is not Active Time of the DRX cycle. A WTRU may not monitor an inactive search space.

Figure 11:
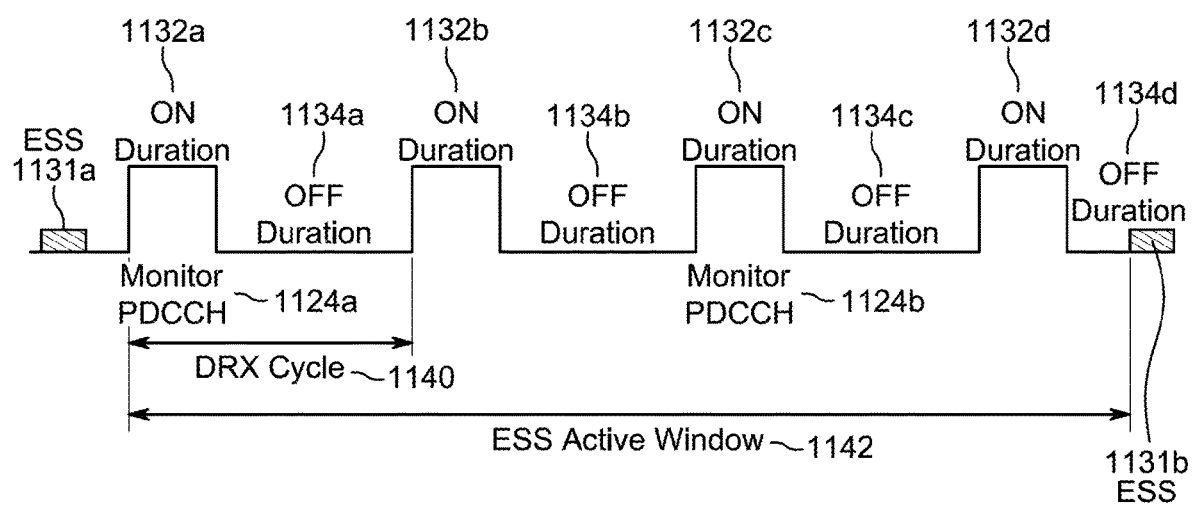
FIG. 11 illustrates an example of ESS association to PDCCH occasions.

FIG. 11 illustrates an example of ESS associated to PDCCH occasions. As shown, FIG. 11 may be similar with FIG. 8 (a), where similarly numbered elements may be the same. Generally, an ESS (e.g., WUS/GOS) may be associated with one or more time windows (e.g., an ON duration, an Active Time, and/or an OFF duration in one or more DRX cycles). A time window in which a WTRU monitors one or more configured search spaces may be referred to as one or more of: an ON duration, a PDCCH monitoring occasion, a set of PDCCH monitoring occasions, a PDCCH monitoring time window, and an Active Time (e.g., of a DRX cycle). As discussed herein, a PDCCH monitoring occasion, a set of PDCCH monitoring occasions, an ON duration, a PDCCH monitoring window, a monitoring window, a monitoring time window, a PDCCH window, and an Active Time may be interchangeably referred to.

An ESS may be associated with one or more PDCCH monitoring occasions, wherein the PDCCH monitoring occasions may be consecutive in time with some time gap. The time gap may be a DRX cycle (e.g., short or long DRX cycle) or a part of a DRX cycle. The time gap may be or may be determined based on the periodicity of a search space. If the number of search spaces associated with an ESS is larger than one, the time gap may be determined based on a shortest or longest periodicity of the associated search spaces. The time gap may be determined based on the repetition level (e.g., maximum repetition number) of the associated search spaces or the CORESET.

The PDCCH monitoring occasions associated with an ESS may be non-consecutive and may follow a pattern. For example, as shown in FIG. 11 an ESS 1131a may be associated with an active window (e.g., 1142), such that the WTRU may or may be expected to monitor PDCCH (e.g., 1124a, 1124b) during at least one ON duration within this active window (e.g., 1132a and 1132c). The ON durations during which the WTRU may perform PDCCH monitoring may be configured or signaled to the WTRU and may follow a pattern. For example, as shown in FIG. 11, the ON durations are the first 1132a and third 1132c ON durations within the ESS active window 1142. After the ESS active window 1142, there may be another ESS 1031b, and the same pattern may repeat.

The number of PDCCH monitoring occasions associated with an ESS may be determined based on the periodicity of the ESS configured, determined, or used.

When an ESS is associated with more than one PDCCH monitoring occasion, the ESS may apply or the ESS may indicate that the ESS applies for all or a subset of PDCCH monitoring occasions within the associated PDCCH monitoring occasions. There may be a variety of indications included in the ESS.

A set of sequences may be configured for an ESS. For example, four sequences may be configured and used as an ESS. The set of sequences may be based on different root sequences and/or different cyclic shifts with the same root sequence. If a first sequence is received by a WTRU in an ESS resource, the WTRU may determine the first set, or subset, of PDCCH monitoring occasions and monitor the determined set of PDCCH monitoring occasions; if a second sequence is received by the WTRU, the WTRU may determine the second set, or subset, of PDCCH monitoring occasions and monitor the determined set of PDCCH monitoring occasions, and so on. The set (or subset) of PDCCH monitoring occasions associated with a sequence may be predetermined, or configured via a higher layer signaling.

A DCI field in an ESS may indicate the set of PDCCH monitoring occasions to which the ESS applies. The ESS may be signaled in the form of a DCI and monitored in a PDCCH search space. An RNTI (e.g., Wake-Up (WU)-RNTI) may be used to distinguish the ESS DCI from other DCI transmissions. Alternatively, a set of RNTIs may be used for ESS and a WTRU may determine the set of PDCCH monitoring occasions based on the RNTI received.

A time location of the ESS may indicate the set of PDCCH monitoring occasions to which ESS applies. For example, one or more time locations may be used as candidate ESS resources and a WTRU may blindly detect the ESS resources; if a WTRU receives an ESS within one of the ESS resources, the WTRU may determine the set, or subset, of PDCCH monitoring occasions to which ESS applies. For example, the WTRU may monitor the determined set (or subset) of PDCCH monitoring occasions if ESS is a WUS.

When an ESS is associated with more than one PDCCH monitoring occasion, the set (or subset) of PDCCH monitoring occasions (e.g., to which ESS applies) within the associated PDCCH monitoring occasions may be determined based on one or more of the following: validity of a PDCCH monitoring occasion for ESS; a DCI format; a search space type a traffic type; and/or a PDSCH length. When ESS applies to a set (or subset) of monitoring occasions a WTRU may monitor PDCCH in the set (or subset) of occasions when the ESS is a WUS and/or the WTRU may skip monitoring PDCCH in the set (or subset) of occasions when the ESS is a GOS.

Validity of a PDCCH monitoring occasion for ESS may be used to determine the set or subset of PDCCH monitoring occasions associated with an ESS or to which the ESS applies. If a PDCCH monitoring occasion is invalid for an ESS, the ESS may not apply for the PDCCH monitoring occasion. A WTRU may monitor a PDCCH monitoring occasion or skip monitoring based on its DRX status or monitor (e.g., always monitor) irrespective of the associated ESS (e.g., WUS or GOS). If a PDCCH monitoring occasion is valid for an ESS, the ESS may apply for the PDCCH monitoring occasion. A WTRU may monitor the PDCCH monitoring occasion or skip monitoring the PDCCH monitoring occasion based on the associated ESS (e.g., WUS or GOS). Validity of a PDCCH monitoring occasion or a set or type of PDCCH monitoring occasions for ESS may be configured (e.g., by a gNB).

DCI format or search space type may be used to determine the set or subset of PDCCH monitoring occasions to which ESS applies and/or to determine the validity of a PDCCH monitoring occasion for ESS. For example, if a PDCCH monitoring occasion is for a certain DCI format or search space type (e.g., for uplink, for uplink grant, for paging, for RAR), a WTRU may consider it as an invalid PDCCH monitoring occasion for an ESS. In another example, if a PDCCH monitoring occasion doesn't include a search space for a downlink grant DCI format, the PDCCH monitoring occasion may be invalid for an ESS. PDCCH monitoring occasions that may include a DL grant or a search space for DL or DL grants may be valid for ESS. If a WTRU does not expect to, or is not expected to, receive an uplink grant, the WTRU may not monitor the associated search space which may be configured for uplink grant only irrespective of the presence or absence of an ESS.

Traffic type may be used to determine the set or subset of PDCCH monitoring occasions to which ESS applies and/or to determine the validity of a PDCCH monitoring occasion for ESS. A WTRU may determine the set, or subset, of PDCCH monitoring occasions to which the indicated ESS applies based on the traffic type associated with the PDCCH monitoring occasion. For example, a PDCCH monitoring occasion associated with, or only associated with, eMBB traffic may be a valid PDCCH monitoring occasion for an ESS. In another example, if a PDCCH monitoring occasion is associated with a delay sensitive traffic, a WTRU may consider the PDCCH monitoring occasion as invalid, or valid, for an ESS.

PDSCH length may be used to determine the set or subset of PDCCH monitoring occasions to which ESS applies and/or to determine the validity of a PDCCH monitoring occasion for ESS. For example, if a PDCCH monitoring occasion is for scheduling a PDSCH with larger than X symbols, the PDCCH monitoring occasion may be considered as valid for an ESS. Otherwise, the PDCCH monitoring occasion may be considered as invalid for an ESS.

In some instances, DRX parameters may be configured via higher layer signaling. The configurations may not always provide the best power saving results. Further, reconfiguring the DRX parameters via higher layer signaling may increase the traffic overhead as well as WTRU power consumption.

In an approach to address these issues, an ESS (e.g., WUS/GOS) may update, reconfigure, or temporarily change a DRX configuration. In an example, an ESS may indicate one or more DRX parameters (e.g., DRX inactivity timer, ON duration timer) for one or more PDCCH monitoring occasions such as the associated PDCCH monitoring occasions or subsequent PDCCH monitoring occasions. In another example, an ESS may change, update, and/or reconfigure one or more DRX parameters.

A set of sequences may be configured for an ESS to indicate one or more DRX parameters or update/change one or more DRX parameters. For example, four sequences may be configured and used as a WUS. If a first sequence is received by a WTRU in an ESS resource, the WTRU may be indicated that the current or previously configured DRX inactivity timer is unchanged. If a second sequence is received by the WTRU, the WTRU may be indicated that another (e.g., a first updated) DRX inactivity timer, which may be predetermined or configured, may be used for the associated PDCCH monitoring occasions, and so on. The candidate values for DRX inactivity timer for dynamic indication may be preconfigured via higher layer signaling.

A DCI field in an ESS may indicate one or more of DRX parameters to be updated, changed, or temporarily changed for the associated PDCCH monitoring occasions.

A time location of the ESS may indicate one or more DRX parameters. For example, one or more time locations may be used as candidate ESS resources and a WTRU may blindly detect the ESS resources; if a WTRU receives an ESS within one of the ESS resources, the WTRU may determine which DRX parameter to use for the associated PDCCH monitoring occasions.

When a WTRU receives an ESS, the WTRU may do one or more of the following: start or restart a timer; stop or reset a timer; increase or decrease a timer value; increment or add a delta (e.g., a configured value) to a timer; and/or, decrement or subtract a delta (e.g., a configured value) from a timer. A timer may be an ON Duration Timer, an Inactivity Timer, a Retransmission Timer (e.g., in the DL and/or the UL), or a random access Contention Resolution Timer. For example, when a WTRU receives a GOS, the WTRU may stop or reset one or more timers. When a WTRU receives a WUS, the WTRU may start or restart one or more timers.

In an approach, an ESS may indicate that there is an additional ESS related information which may need to be monitored or received in the associated PDCCH monitoring occasions. For example, an ESS may indicate either a WUS/GOS without DRX configuration change or WUS/GOS with DRX configuration change. If the ESS indicates WUS/GOS with DRX configuration change, a WTRU may monitor the additional DRX configuration change information in one or more PDCCH search spaces within the associated PDCCH monitoring occasions.

The additional DRX configuration change information may be signaled or received in a DCI (e.g., with a specific RNTI). The DCI may have the same size as a DCI for a downlink grant monitored in the PDCCH monitoring occasions. The DCI may be monitored by a WTRU in a subset of (e.g., in a first few) monitoring occasions, slots, subframes, or frames. The RNTI may be DRX-RNTI. If a WTRU doesn't receive the DCI for DRX configuration change information, the WTRU may use the previously configured DRX configuration for the associated PDCCH monitoring occasions.

The additional DRX configuration change information may be signaled or received in the DCI for a downlink grant. Some bit field(s) in the DCI may be reused to indicate the DRX configuration change information.

In another approach, one or more DRX parameters (e.g., DRX inactivity timer, ON duration timer) may be (e.g., implicitly) determined based on one or more of the following: a PDCCH candidate and/or PDCCH location in which a WTRU may receive a downlink grant (e.g., a first downlink grant); a search space ID for a search space in which a WTRU may receive a downlink grant (e.g., a first downlink grant); a number of RBs scheduled for a downlink grant (e.g., a first downlink grant); and/or, a modular coding scheme (MCS) level selected or indicated for a downlink grant.

In some instances there may be an association between WUS/GOS and reduced PDCCH monitoring. An ESS may be transmitted before the ON duration of a DRX cycle to indicate to the WTRU to wake up during the upcoming ON duration. Within the ON duration, the WTRU is expected to monitor the PDCCH at the configured PDCCH monitoring occasions. In one instance, the WTRU may choose to (e.g., by configuration and/or dynamic signaling) reduce the PDCCH monitoring instances to reduce power consumption.

The reduced PDCCH monitoring pattern during the ON duration and the ESS may be associated in one or more cases.

In one case, the ESS signal may contain control information to indicate the reduced PDCCH monitoring pattern. For example, it may contain a length-N bitmap where the bitmap may indicate which of the slots in a window of N slots may be used for PDCCH monitoring. The information in the ESS signal may be intended for a single user or a group of users.

In one case, the control information regarding the reduced PDCCH monitoring pattern may stay valid until a timer expires. The time when the time starts may be determined by the WTRU based on an agreed rule. For example, the timer may start with the ON duration of the DRX cycle.

In one case the PDCCH monitoring reduction pattern may be indicated to the WTRU within the ESS signal and to activate and/or to deactivate the actual PDCCH monitoring reduction may be indicated within the PDCCH transmitted during the ON duration. As an example, the ESS may set a length-N bitmap corresponding to the PDCCH monitoring during the N PDCCH occasions, and the PDCCH transmitted in every (N−1) th occasion may activate and/or deactivate the monitoring pattern for the following N occasions. The activation and/or the deactivation information may be indicated by a single bit.

In one case, the monitoring reduction pattern may be configured (e.g., semi-statically) and the reduced monitoring may be activated and/or deactivated within the ON duration as explained above.

In one case, the monitoring reduction pattern may be configured (e.g., semi-statically) and the reduced monitoring may be activated and/or deactivated using the ESS. If the WTRU does not receive such an indication within the ESS, it may not perform monitoring of the reduction pattern.

In one case, the monitoring reduction pattern may be signaled within the control channel during the ON duration. Whether this signaling would take place or not may be indicated to the WTRU within the ESS. If the WTRU does not receive such an indication, it may not monitor the PDCCH carrying this signaling.

In one case, the PDCCH monitoring reduction information may be transmitted within the ON duration, for example in the PDCCH. This information may be destined for a single WTRU or a group of WTRUs. The ESS and/or at least one parameter of the ESS and the PDCCH monitoring reduction information and/or at least one parameter of this information may be associated. At least one of the CORESET, PDCCH candidate set, search space, AL defining the location and structure of the PDCCH where the reduction information is transmitted may be determined by the ESS. For example, the search space of the reduction information may be the same or a subset of the search space of the WUS. In another example, CORESET of the reduction information may be the same or a subset of the CORESET of the WUS. In another example, the exact same PDCCH location and structure may be used to transmit both the ESS and the monitoring reduction information.

In one case, a WTRU may start receiving the ON duration of a DRX cycle with a pre-configured first power mode (e.g., a low power mode with a smaller number of RF chains than the maximum available). A first timer may also be started. A higher power mode, for example, may be associated with a larger number of RF chains.

If a channel (e.g., a PDCCH that schedules PDSCH or PDSCH) is detected before the first timer expires, the WTRU may transition to a second power mode (e.g., a higher power mode with a larger number of RF chains and may start a second timer). The channel(s) that triggers transition to a different power mode when detected may be pre-configured. While the second timer is running and the WTRU again receives at least one of the pre-configured channels, then the second timer may be reset or set to a different value and restarted. When the second timer expires, the WTRU may revert to the first power mode and restart the first timer. Note that the WTRU may need a gap between power mode transitions.

If a pre-configured channel is not detected before the first timer expires, the WTRU may continue to stay in the first power mode and may restart the first timer when it expires or may set the value of the first timer to a different value and restart it.

In another case, the WTR may be receiving with a first power mode; for example, low power mode and may be monitoring PDCCH. When a first channel is detected, for example PDCCH and/or PDSCH, the WTRU may transition to a higher power mode. The channel that triggers power mode transition may be restricted, for example to only PDCCH and PDSCH. The transition to a lower power mode may be initiated by the gNB using DCI in a control channel.

The power mode transition process may be activated by a signal received before the ON duration (e.g., a wake-up signal).

In some cases there may be one or more formats for an ESS. In one case, one type of ESS may be transmitted using PDCCH. When DRX in configured and when the ESS is transmitted outside the DRX ON duration (i.e., during the OFF duration), the ESS may indicate to the WTRU whether the WTRU needs to wake-up for at least one upcoming ON duration. In such a case, and upon reception and detection of the ESS, the WTRU may: decide to wake-up only for a single ON duration that follows the ESS; decide to wake-up for k consecutive ON durations that follow the ESS, where k may be an integer, and where the quantity k may be transmitted in the ESS PDCCH or it may be configured; and/or, decide to wake-up for the n ON durations out of k ON durations that follow the ESS. The ON durations that the WTRU decides to wake-up and the ON durations that the WTRU decides not to wake-up may be indicated with a bitmap or an index to a pre-configured table. For example, the bitmap [1 1 0 1 0 1] may indicate that the WTRU would have to wake-up in the first, second, fourth, and sixth ON durations following the detection of the ESS.

The ON durations in the techniques discussed herein may belong to a short DRX cycle, a long DRX cycle, or any type of DRX cycle.

In one instance, there may be a time gap between the time when the WTRU detects the ESS and when the WTRU implements the signaled wake-up or not-wake-up indication(s). The time gap may be indicated to the WTRU in the DCI or may be configured, and it may be quantified in terms of at least one of slots, DRX cycles, subframes or frames, or OFDM symbols. It may also be possible to fix the value of k; for example, a WTRU may be expected to implement the indicated wake-up or not-wake-up signal starting at the next ON duration that follows the ESS. In one instance, the value of the time gap or a range of values for the time gap may be fed back to the gNB by the WTRU.

Note that while examples are given herein in the context of a WTRU waking up from a sleep state, similar methods may be applicable to a WTRU going to a sleep state when the WTRU is already awake. Specifically, upon reception and detection of the ESS, the WTRU may: decide to sleep only for a single SLEEP duration that follows the ESS; decide to sleep fork consecutive SLEEP durations that follow the ESS, where k may be an integer, and where the quantity k may be transmitted in the ESS PDCCH or it may be configured; and/or, decide to sleep for the n SLEEP durations out of k SLEEP durations that follow the ESS. The SLEEP durations that the WTRU decides to sleep and the SLEEP durations that the WTRU decides not to sleep may be indicated with a bitmap or an index to a pre-configured table. For example, the bitmap [1 1 0 1 0 1] may indicate that the WTRU would have to sleep in the first, second, fourth, and sixth SLEEP durations following the detection of the ESS.

There may be a time gap between the time when the WTRU detects the ESS and when the WTRU implements the signaled sleep or not-sleep indication(s). The time gap may be indicated to the WTRU in the DCI or may be configured, and it may be quantified in terms of at least one of slots, DRX cycles, subframes or frames or OFDM symbols. In one method, the value of the time gap or a range of values for the time gap may be fed back to the gNB by the WTRU. A SLEEP duration may be quantified in terms of at least one of slots, DRX cycles, subframes or frames, or OFDM symbols.

The ESS may be WTRU-specific (i.e., the information in the ESS targets a single WTRU) or the ESS may be group common (i.e. the information in the ESS targets more than one WTRU such as a group of WTRUs). A WTRU may use two different RNTIs to detect whether the ESS is WTRU-specific or group-common. For example, if the CRC of the DCI included in the ESS is scrambled with C-RNTI, then the WTRU may decide that ESS targets only itself; or if the CRC of the DCI in the ESS is scrambled with PS-RNTI (Power Saving-RNTI), then the WTRU may decide that the ESS targets a group of WTRUs including itself. In one instance, one common DCI format may be used for both types of ESS (i.e., WTRU specific or group-common) and the contents of the ESS may be interpreted differently based on the type of the ESS. In one instance, a single RNTI (e.g., PS-RNTI) may be used and searched by the WTRU to carry power saving related information.

When the ESS is used to indicate whether to wake-up or not to wake-up during a specific DRX ON duration for a group of WTRUs, there may be more than one possible outcome or scenario for such a case. Note, although some of the techniques discussed herein are presented in the context of a WTRU waking up from sleep state within a DRX cycle, similar methods may be applicable to a WTRU going to sleep state when the WTRU is already awake.

In one example, when the ESS is used to indicate whether to wake-up or not to wake-up during a specific DRX ON duration for a group of WTRUs, then all of the WTRUs in the group may decide to wake-up or not to wake up during a specific ON duration. Upon reception and detection of the ESS with PS-RNTI, the group of WTRUs may decide to wake-up only for the immediate next ON duration that follows the ESS. Upon reception and detection of the ESS with PS-RNTI, the group of WTRUs may decide to wake-up for the next k ON durations that follow the ESS. The quantity k may be transmitted in the ESS PDCCH or it may be configured. Upon reception and detection of the ESS with PS-RNTI, the group of WTRUs may decide to wake-up for the n ON durations out of k ON durations that follow the ESS. The ON durations that one WTRU in the group decides to wake-up and the ON durations that one WTRU in the group decides not to wake-up may be indicated with a bitmap or an index to a pre-configured table. In one instance, there may be a time gap between the time when one WTRU detects the ESS and when one WTRU implements the signaled wake-up or not-wake-up indication(s). The time gap may be indicated to the WTRU in the DCI or may be configured or may be fixed and may be quantified in terms of one of slots, DRX cycles, subframes or frames.

In another example, when the ESS is used to indicate whether to wake-up or not to wake-up during a specific DRX ON duration for a group of WTRUs, then the DCI may indicate to each WTRU, or to each group of WTRUs, whether to wake-up or not-to-wake-up during an ON duration, for example by using a bitmap or an index to a pre-configured table. Each bit in the bitmap may indicate to one specific WTRU or a group of WTRUs whether to wake-up or not-to wake-up. A WTRU may identify the bit that carries information for itself within the bitmap by using a pre-configured mapping or by using a function (e.g., one that contains a modular operation) that depends on a WTRU-specific quantity such as the WTRU ID or a WTRU-group-specific quantity such as the WTRU-group ID. For each WTRU, there may be a time gap between when the ESS is detected and when the indicated operation is implemented, and this time gap may be signaled in the DCI or it may be pre-configured. Similar to techniques described herein, in one instance each WTRU may be indicated with a pattern that describes during which n ON durations out of k ON durations to wake-up. A WTRU may identify the index of the pattern that carries information for itself by using a pre-configured mapping or by using a function (e.g., one that contains a modular operation) that depends on a WTRU-specific quantity such as the WTRU ID.

The ESS signal may indicate wake-up, go-to-sleep, reduced PDCCH monitoring (e.g., reducing the PDCCH monitoring periodicity or indicating to skip certain PDCCH monitoring occasions), or the like. The type of the ESS signal may be determined based on at least one of RNTI, DCI format, search space, CORESET, and/or the ON/OFF status of the configured monitoring occasions when DRX is configured. For example, when the configured monitoring occasion of the ESS signal is during the OFF duration of a DRX cycle, the ESS signal may be interpreted by the WTRU as a wake-up signal. When the configured monitoring occasion of the ESS signal is during the ON duration of a DRX cycle, or when DRX is not configured and the WTRU is configured to be awake by default at all times, the ESS signal may be interpreted by the WTRU as a go-to sleep signal or a reduced PDCCH monitoring signal. When the type of the signal can be implicitly determined based on a relationship between the monitoring occasion and the DRX configuration, a single DCI format may be used for both types of the ESS and the interpretation of the DCI bits may depend on the ESS type. In one instance, the bit fields within the DCI may indicate information about at least one power saving scheme. For example, the DCI may contain bit fields that indicate at least one of the type of ESS (i.e., WUS or GOS), if cross-slot scheduling is activated or de-activated, pattern of PDCCH monitoring, and the like.

In some situations, an ESS (e.g., WUS) may be supported for a single beam based system, and a single beam-based ESS may not be applicable for a system with multiple beams (e.g., high frequency network). In order to address this issue, one or more receiver beams (e.g., spatial Rx parameter, QCL type-D) may be used for one or more CORESETs monitored by a WTRU. A (e.g., each) CORESET may be associated with a downlink reference signal (e.g., SSB or CSI-RS) in terms of quasi-collocation (QCL) type-D (e.g., spatial Rx parameter). A WTRU may determine which Rx beam to use for a PDCCH candidate monitoring. For example, if a PDCCH candidate is based on a CORESET and the CORESET is associated with a first SSB (e.g., SSB id or index) in terms of QCL type-D, a WTRU may determine which Rx beam to use to monitor the PDCCH candidate based on the information (e.g., the QCL information) of the first SSB. A receiver beam, Rx beam, a beam, spatial Rx parameter, spatial Rx QCL parameter, QCL type-D, a transmit beam, and a Tx beam may be used interchangeably.

In an approach, a beam (e.g., Rx and/or Tx beam) for an ESS may be determined based on the beam for a common search space. For example, CORESET #0 (e.g., CORESET-id=0) may be used for a common search space. The beam for an ESS may be the same as the beam for the CORESET #0. A WTRU may determine a Rx beam to receive the ESS based on the beam used for the CORESET #0. If an active BWP doesn't include CORESET #0, the WTRU may use a beam for the CORESET with the lowest CORESET-id in the active BWP.

In an approach, the beam for an ESS may be determined based on the CORESETs in the associated PDCCH monitoring occasions. For example, an ESS may be used for a PDCCH monitoring occasion, where the PDCCH monitoring occasion may include PDCCHs of one or more CORESETs. A WTRU may use a Rx beam from one of the CORESETs in the PDCCH monitoring occasion.

In one scenario, the Rx beam for an ESS may be based on the beam for the CORESET with a lowest CORESET-id. For example, if the PDCCH monitoring occasion includes CORESET-id=1, CORESET-id=2, and CORESET-id=4, the beam for CORESET-id=1 may be used to receive the ESS. If the number of beams configured for the CORESET is greater than 1, a WTRU may determine the first entry of the configured beams to monitor an ESS.

In one scenario, the Rx beam for an ESS may be based on the beam for the first search space (e.g., first search space a WTRU may need to monitor within the associated PDCCH monitoring occasions). The beam for the first search space may be the beam for the associated CORESET with the first search space. If one or more search spaces are monitored at the same time, the search space with the lowest search space ID (e.g., SearchSpaceID) may be used. Alternatively, the search space associated with a CORESET with the lowest CORESET-id may be used.

In one scenario, the Rx beam for an ESS may be based on the quality of beams for the CORESETs in the associated PDCCH monitoring occasions. A WTRU may determine the best quality beams within the set of beams for the CORESETs, where the quality of a beam may be based on RSRP (or L1-RSRP) or measurement quality of the beam. A WTRU may indicate to a gNB when the best beam (e.g., for ESS) is changed by using at least one of the following: PRACH resource (e.g., contention-free PRACH resources configured for one or more beams); and/or, PUCCH (e.g., a WTRU may send an UCI to indicate a beam index for the ESS). A gNB may indicate, or confirm, the beam index for an ESS.

Figure 12:
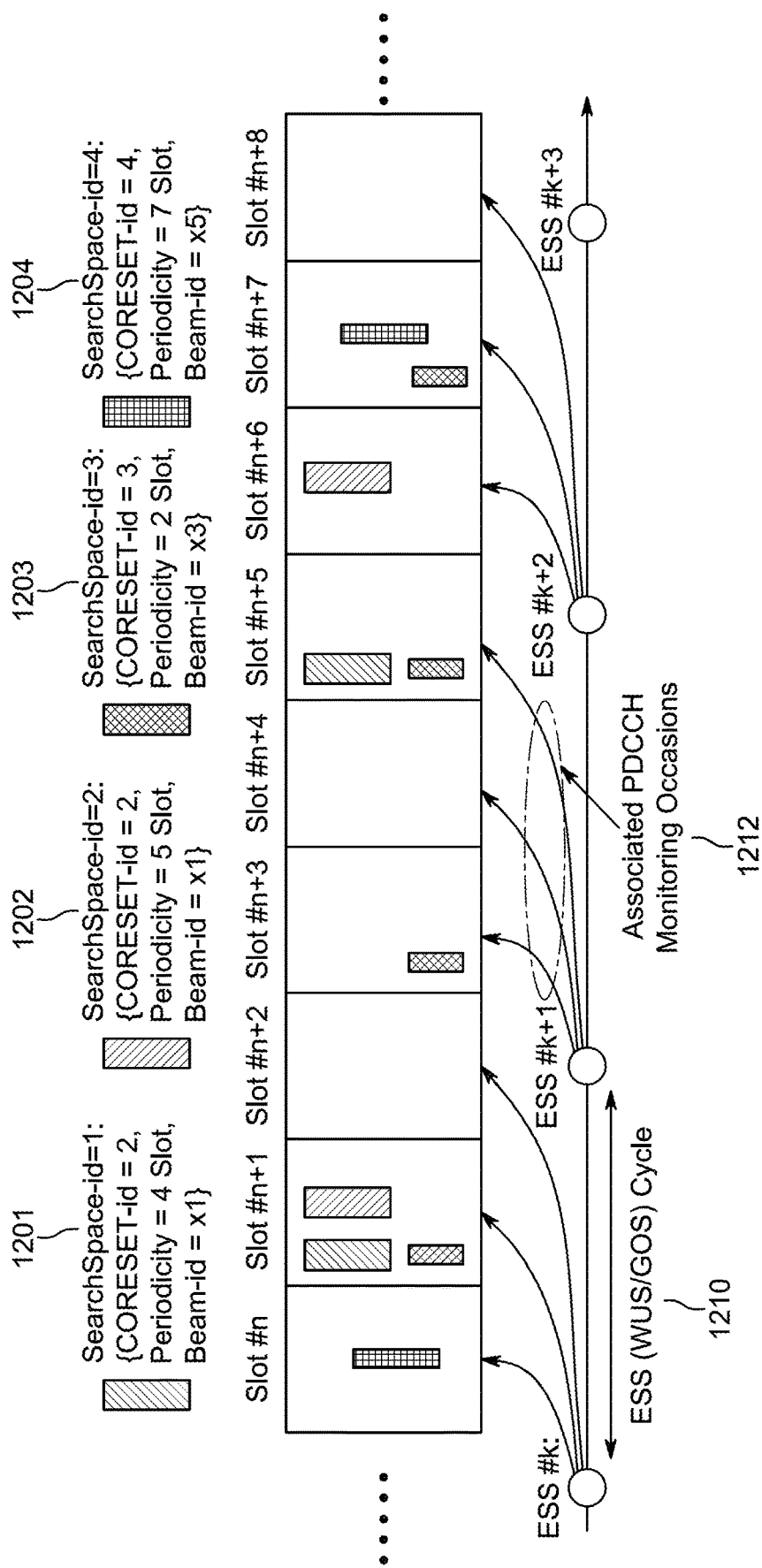
FIG. 12 illustrates an example of an example of beam association between an ESS and PDCCH monitoring occasions.

FIG. 12 illustrates an example of beam determination for ESS based on the search spaces and CORESETs in the associated PDCCH monitoring occasions. The example of FIG. 12 may be illustrated in the context of Table 1, which shows an example of beam determination of an ESS based on an associated CORESET.

TABLE 1

An example of beam determination of an ESS based on associated CORESET.

| Solutions to determine the beam of ESS | Beam-id for an ESS | | |
|---|---|---|---|
| | ESS # k | ESS # k + 1 | ESS # k + 2 |
| A beam for the CORESET associated with the first search space within the associated PDCCH monitoring occasions | Beam-id = x5 | Beam-id = x3 | Beam-id = x1 |
| A beam for the lowest CORESET-id within the associated PDCCH monitoring occasions | Beam-id = x1 | Beam-id = x1 | Beam-id = x1 |
| A beam strength within the associated PDCCH monitoring occasions (e.g., beam strength: x1 < x3 < x5) | Beam-id = x5 | Beam-id = x3 | Beam-id = x5 |
| A beam strength within all configured CORESETs | Beam-id = x5 | Beam-id = x5 | Beam-id = x5 |

As shown, at 1201 for SearchSpace-id=1, the CORESET-id=2, Periodicity is every 4 slots, and Beam-id=x1. At 1202 for SearchSpace-id=2, the CORESET-id=2, Periodicity is every 5 slots, and Beam-id=x1. At 1203 for SearchSpace-id=3, the CORESET-id=3, the Periodicity is every 2 slots, and the Beam-id=x3. At 1204 for SearchSpace-id=4, the CORESET-id=4, the Periodicity is every 7 slots, and the Beam-id=x5. As shown, ESS is shown in increments of 1 starting with some number #k and may occur in cycles 1210. The Slots are shown in increments of 1 starting at some number #n. The periodicity of each search space can be seen according to their patterned boxes (e.g., SearchSpace-id=4 occurs in slot #n, and again 7 slots later in slot #n+7 since the periodicity is every 7 slots). In this example, the slots (e.g., #n+3, #n+4, #n+5) immediately following the ESS (e.g., #k+1) may be associate PDCCH monitoring occasions.

In an approach, the beam for an ESS may be determined based on the bandwidth part id (BWP-id) of the BWP in which the WTRU may monitor the ESS. For example, a beam-id may be configured per BWP for an ESS monitoring. The Rx beam for an ESS may be based on the configured beam-id irrespective of the beams used for the CORESETs in the associated PDCCH monitoring occasions.

In an approach, an ESS may be repeated with a number of beams used for the CORESETs in the associated PDCCH monitoring occasions. For example, if three CORESETs are located in the associated PDCCH monitoring occasions and each CORESET is associated with a different beam, the ESS may be repetitively transmitted with three beams used for the CORESETs. In such a situation, one or more of the following may apply: an ESS with no repetition may be transmitted within a symbol or a WTRU may receive or detect an ESS in a subset of beams.

For the ESS with no repetition transmitted within a symbol, if N repetitions are used for an ESS transmission, N symbols with a time gap between symbols may be used (e.g., the time gap may be the gap for beam switching, and N symbols may be consecutive with one or more time gaps). For the WTRU receiving or detecting an ESS in a subset of beams, if a WTRU received the ESS with any of the beams, the WTRU may monitor PDCCHs in all CORESETs in the PDCCH monitoring occasions, and/or if a WTRU received the ESS with a subset of beams, the WTRU may monitor PDCCHs in the corresponding CORESETs.

In an approach, the Rx beam for an ESS may be configured (e.g., by a gNB). For example, the associated CORESET-id may be configured or indicated for the ESS reception in terms of QCL type-D. Alternatively, a TCI state may be configured to indicate the Rx beam for an ESS.

In an approach, a WTRU may measure the beam quality of the beam used for an ESS monitoring. If the beam quality of the associated ESS is below a threshold, at least one of the following may apply: a WTRU may ignore the ESS and monitor PDCCHs in the associated PDCCH monitoring occasions, for example according to a DRX cycle without consideration for ESS; a WTRU may send a request to update the beam for the ESS, where the request may be sent using one or more of PRACH resources (e.g., contention-free or contention-based PRACH resources), scheduling request (SR) resources, PUCCH resources, and/or SRS resources; a WTRU may start monitoring one or more beam recovery search spaces for an ESS, where the beam recovery search space may be SearchSpace-BFR; and/or, the threshold may be different from a threshold used for beam failure recovery for one or more PDCCH, where the threshold may be configured for an ESS. The RS within the ESS may be used to determine the quality, where if it is below a threshold then the PDCCH monitoring may start.

Regarding the timer, if the time interval between the last SSB to the ESS (e.g., WUS) is above a threshold, then beam sweeping may be initiated, and additionally, the WTRU may ignore the WUS, (i.e., stop monitoring the ESS) and initiate monitoring the PDCCH in the associated ON duration.

In some instances, DRX parameters may be configured and the same DRX parameters may be used for all search spaces. In NR, each search space may serve a different traffic type, use cases, and/or QoS requirements. Using the same DRX parameters for all configured search space may not optimize the WTRU battery saving.

In order to address this issue, one or more DRX parameters may be configured for a (e.g., each) search space or for a set of search spaces. For example, one or more DRX configurations may be used and a search space may be associated with one of the DRX configurations. A DRX configuration may include one or more (e.g., all) DRX parameters. A DRX parameter may be at least one of a DRX cycle, a DRX inactivity timer, an ON duration timer, a DRX retransmission timer (e.g., for UL and/or DL), a DRX short cycle, a DRX short cycle timer, a DRX long cycle, a DRX long cycle timer, and/or a random access Contention Resolution Timer.

For this approach of one or more DRX parameters being configured to a search space or set of search spaced, one or more of the following may apply: a DRX configuration may have a DRX configuration ID (e.g., DRXConfigID); a search space configuration may include an associated DRX configuration ID (or DRX configuration); a CORESET configuration may include an associated DRX configuration ID (or DRX configuration), and one or more (e.g., all) search spaces may use the DRX parameters configured for the associated CORESET; a BWP configuration may include an associated DRX configuration ID (or DRX configuration), where a search space in a BWP may use the DRX parameters configured for the BWP; and/or, a DRX cycle of a DRX configuration may be an integer multiple of a DRX cycle of another DRX configuration.

One or more common DRX parameters may be configured for and/or apply to at least some (e.g., all) search spaces configured in a cell and one or more dedicated DRX parameters may be configured for a (e.g., each) search space or BWP. In such a case, one or more of the following may apply: a common DRX parameters may be provided in a common DRX configuration; one or more dedicated DRX parameters may be indicated in a (e.g., each) search space or BWP configuration; common DRX parameters may be provided and/or used for one or more common spaces; and/or, one or more dedicated DRX parameters may be provided and/or used for a WTRU-specific search space.

A WTRU may follow the DRX cycle for a search space using the DRX parameters configured for and/or applicable to the search space. The WTRU may monitor or stop monitoring PDCCH in a search space based on the DRX cycle and/or parameters associated with (e.g., configured for and/or applicable to) the search space. Dedicated or WTRU-specific DRX parameters may be configured for a search space and/or BWP. Common DRX parameters may be configured, for example via broadcast signaling. Common DRX parameters may be applicable to a search space and/or BWP.

Figure 13:
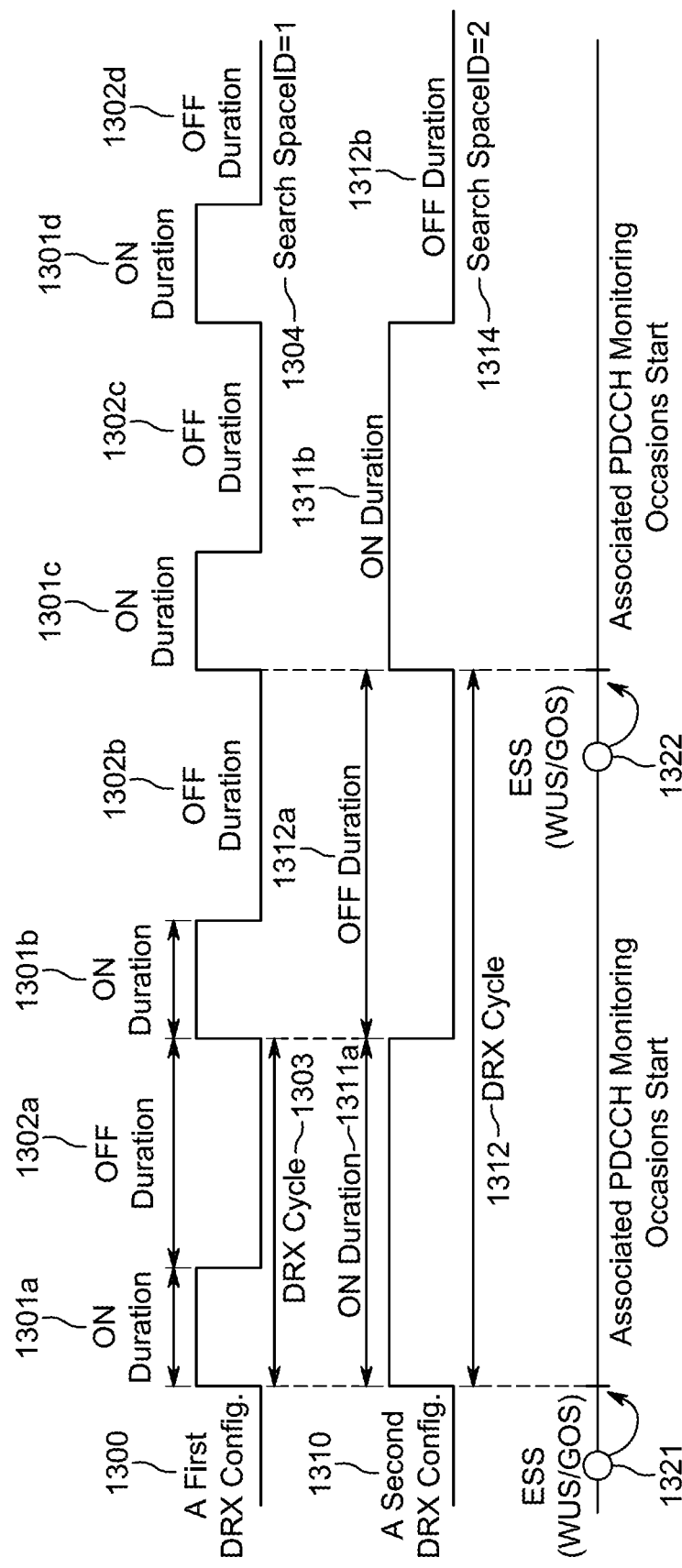
FIG. 13 illustrates an example of the search space specific DRX configuration.

FIG. 13 illustrates an example of the search space specific DRX configuration, where the DRX cycle of the second DRX configuration may be an integer multiple of the DRX cycle of the first DRX configuration. As shown, for a first DRX configuration 1300 there may be an ON Durations (e.g., 1301a, 1301b, etc.) and OFF Durations (e.g., 1302a, etc.), which may be preceded by an ESS (e.g., 1321). Relative to the first DRX configuration 1300, there may be a second DRX configuration 1310 where the DRX cycle 1313 is twice that of the DRX cycle 1303 of the first DRX configuration 1300. ON and OFF Durations may similarly occur (e.g., ON Duration 1311a, OFF Duration 1312a).

An ESS (e.g., WUS/GOS) may be used for or with one or more DRX configurations: the number of PDCCH monitoring occasions associated with an ESS for a first DRX configuration may be different from the number of PDCCH monitoring occasions associated with the ESS for a second DRX configuration; and/or the time window associated with an ESS may be determined based on a DRX configuration with a longest DRX cycle (e.g., the cycle of an ESS may be an integer multiple of the longest DRX cycle within the DRX configurations).

An ESS may be associated with one or more DRX configurations and the ESS may indicate which DRX configurations may be associated with the ESS in each ESS transmission, where one or more of the following may apply: an ESS may indicate which subset of search spaces in the associated PDCCH monitoring occasions are associated with the ESS, where the subset may include all search spaces; and/or, an ESS may indicate associated DRX configuration IDs (e.g., a WTRU may monitor the search spaces associated with the DRX configuration ID indicated by the ESS).

An ESS may be associated with one or more DRX configurations and the ESS may determine whether a WTRU may monitor all search spaces in the associated PDCCH monitoring occasions or not.

Figure 14:
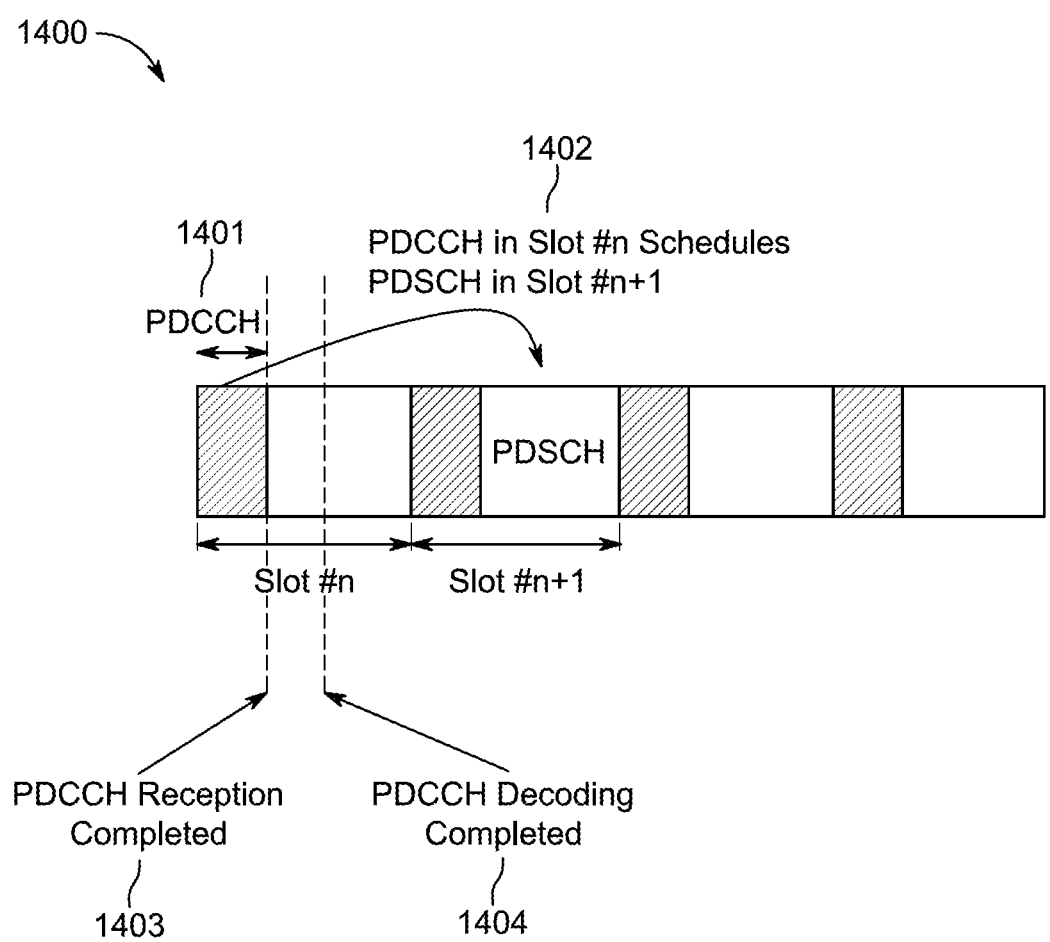
FIG. 14 illustrates an example of cross slot scheduling.

An ESS (e.g., WUS/GOS) may be configured for a (e.g., each) DRX configuration, where the one or more ESS resources may be monitored in a same time location FIG. 14 illustrates an example of cross slot scheduling. In some cases, a time domain resource allocation may be considered for WTRU power saving. In this example, for a WTRU to save power is the ability go into one type of sleep mode for the remainder of the slot #n after reception of the PDCCH 1401 is completed 1403 while continuing the decoding 1404 of the PDCCH. This type of power saving method can be used if the WTRU is aware that the PDSCH scheduled by the PDCCH is not scheduled for transmission in the same slot as the PDCCH. For example, a PDCCH may be transmitted in slot n to schedule a PDSCH by that PDCCH to be transmitted in slot n+k0 where k0 is at least 1 slot, as shown at 1402. This type of scheduling may also be referred to as cross-slot scheduling.

The PDCCH includes the time domain resource allocation of the PDSCH. The time domain resource allocation may include the value of k0 and the indices of the OFDM symbols in slot #n+k0 to carry the PDSCH. The time domain resource allocation field in the DCI carried by the PDCCH may be an index to a pre-configured table where the index may indicate one row (e.g., an entry within that table). Each entry may include a value for k0 and other information. If at least one row if the preconfigured table contains k0=0, the WTRU may have to continue receiving the incoming signal until the PDCCH is decoded (e.g., instead of going to sleep mode after the reception of the PDCCH is completed) since it cannot know the actual value of k0 until PDCCH is decoded.

In some cases, the WTRU may be configured with at least two resource allocation tables where at least one of the tables may not contain any entries with k0=0, (i.e., all of the entries in this table support cross-slot scheduling, which may be referred as the CS-Table). At least one other table may contain at least one entry with k0=0 (e.g., this table may be referred to as the M-Table). Note that there may be more than one CS-Table and more-than M-Table in general, but the methods and techniques discussed herein may be presented using one table from each without loss of generality.

In one instance, the WTRU may be configured to use one of the tables as the default table. The usage of the other table may be configured to be semi-persistent and may be activated and/or deactivated using signaling from the gNB. The activation/deactivation signaling may be achieved using a MAC CE or Layer-1 signaling.

Figure 15:
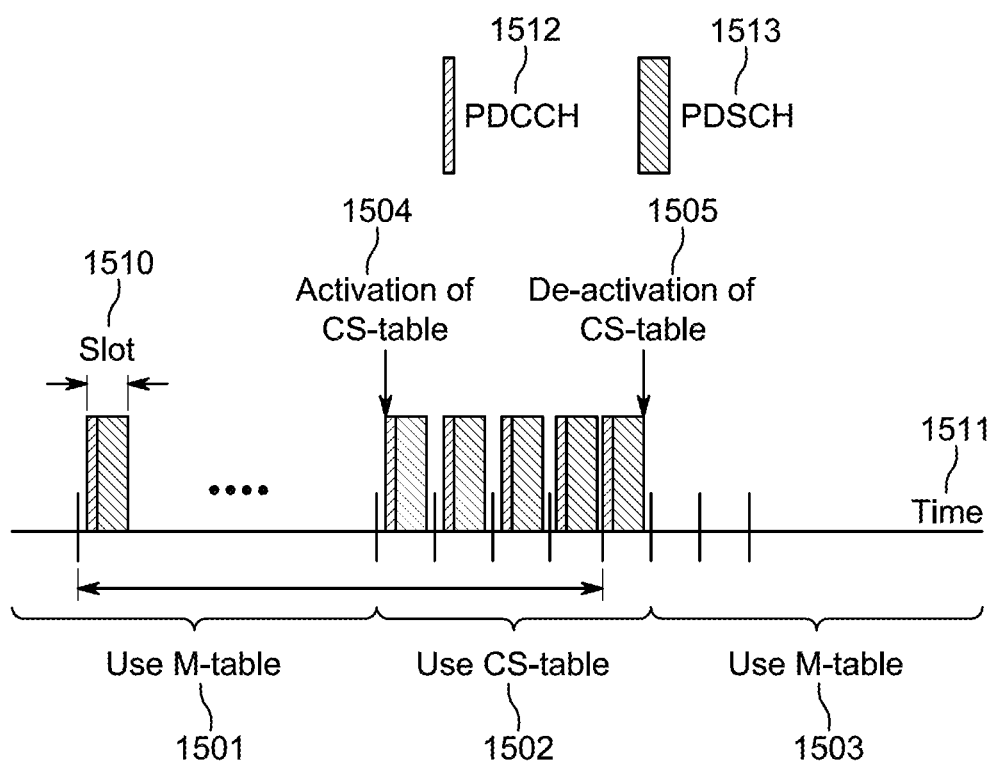
FIG. 15 illustrates an example of cross-slot and same-slot scheduling adaptation.

FIG. 15 illustrates an example of cross-slot and same-slot scheduling adaptation. Time may be shown on the horizontal axis 1511, and for a given slot 1510, there may be a PDCCH 1512 and a PDSCH 1513 as shown by the patterned blocks. As shown in, a WTRU may be configured to use the M-Table 1501 by default (i.e., the time domain resource allocation field in the DCI transmitted within the PDCCH points to an entry in the M-table 1501). Subsequently, an activation command may be received by the WTRU and this activation command may activate 1504 the CS-Table 1402. Once the activation is completed, time domain resource allocation field in the DCI transmitted within the PDCCHs following the completion of the activation may be mapped to an entry in the CS-Table 1502 by the WTRU. There may be a time gap between when the activation command is received by the WTRU (e.g. slot #m) and when the activation command is completed (i.e., when the WTRU starts using the activated table), (e.g. in slot #m+m0 where m0 may be referred to as the activation offset). The activation offset may be quantified in terms of slots, OFDM symbols, subframes, or frames. The value of the activation offset be transmitted within the activation command or it may be configured. In one instance, if the activation is done using a MAC CE, the value of the activation offset may be determined by the WTRU using the HARQ-ACK timing of the MAC CE activation command. For example, if an ACK is fed back to the gNB in slot #y and this ACK is in response to the MAC CE transmission, the activation may be assumed to be complete in slot #y+y0 where y0 may be equal to largen than zero slots.

Similarly, the CS-Table 1502 may also be de-activated 1505 either by signaling (e.g., using MAC CE or Layer-1 signaling) or by the expiration of a timer. The value of the timer may be configured, or it may be transmitted within the activation command. There may be a time gap between when the deactivation command is received and when the deactivation command is completed (i.e., the WTRU stops using the deactivated table), and this time gap may either be transmitted within the deactivation command or it may be configured. Similar to the activation process, if MAC CE is used for deactivation, the time gap may be determined based on the HARQ-ACK timing of the MAC CE command. The WTRU may be expected to use the default M-Table 1503 for time domain resource allocation determination once the CS-Table 1502 is deactivated.

Note that in general the activation/deactivation command may be used to activate/deactivate any one of the tables that are configured for that specific WTRU (e.g., the previously mentioned methods above activated/deactivated the CS-Table).

In another case, a search space may be associated with a type of resource allocation table. For example, when the WTRU is using SearchSpace-1 to search for the PDCCH, it may assume that the M-table is used for time domain resource allocation; and when the WTRU is using SearchSpace-2 to search for the PDCCH, it may assume that the CS-table is used for time domain resource allocation. One of the search spaces may be configured as semi-persistent and may be activated/deactivated.

For example, a WTRU may be configured to use the SearchSpace-1 by default, and due to the association to the M-table, the WTRU may expect that the time domain resource allocation index in the detected DCI points to an entry in the M-table. Then, an activation command may be received by the WTRU and this activation command may activate the SearchSpace-2. There may be a time gap between when the activation command is received and when the activation is completed, and this time gap may either be transmitted within the activation command or it may be configured. After the SearchSpace-2 becomes active, due to the association to the CS-table, the WTRU may expect that the time domain resource allocation index in the detected DCI points to an entry in the CS-table. Similarly, the CS-Table may also be de-activated either by signaling (e.g., using MAC CE or Layer-1 signaling) or by the expiration of a timer. The value of the timer may be configured, or it may be transmitted within the activation command. There may be a time gap between when the deactivation command is received and when the corresponding table is deactivated, and this time gap may either be transmitted within the deactivation command or it may be configured. For activation or deactivation with MAC CE, the time gap may be determined using the HARQ-ACK timing of the MAC CE command.

Note that it may also be possible to link the time resource allocation tables to another parameter other than the search space. In this case, the activation/deactivation of this parameter would activate/deactivate the corresponding table. For example, this parameter could be a CORESET, a power saving state (e.g. low power state and default power state), or the like.

In one case, the activation/deactivation of a resource allocation table or a search space linked to the table or another parameter linked to the table may be achieved with an L1-signal, for example a DCI transmitted in the PDCCH and the CRC of the DCI may be scrambled with a specific RNTI (e.g., power saving RNTI (PS-RNTI)). A search space for the L1-signaling may be defined (i.e., the WTRU may monitor the L1-signal with the configured periodicity). The L1-signal may indicate whether to activate a table (e.g., the CS-table) using at least one bit or which table to activate using at least one bit. If a table is activated, it may stay active until the next monitoring occasion of the L1-signal when another table may be activated, or the same table may be kept active. The L1-signal detected in slot #n-x may activate the corresponding table in slot n. The value of x may be determined based on HARQ-ACK timing of the PDSCH carried in slot n–x; or it may be indicated within the L1-signal, or it may be configured. In another method, if a table is activated, it may not necessarily stay active until the next monitoring occasion of the L1-signal and the duration how long it is going to stay active may be indicated within the L-1 signal or it may be configured. Note that the L1-signal may be a separate entity used just for the purpose of time domain resource allocation method determination or it may be carried within an existing another L1-signal (e.g., PDCCH that is used to schedule PDSCH or PDCCH that is used for power saving purposes).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU) comprising a processor and memory, the processor and memory configured to:
   receive a wakeup signal (WUS) during a period of time prior to a start of discontinuous reception (DRX) active time when performing DRX in accordance with a long DRX cycle length;
   start an on-duration timer when performing DRX in accordance with the long DRX cycle length in response to receiving the WUS, wherein the WUS indicates that the WTRU is to monitor for physical downlink control channel (PDCCH) transmissions during DRX active time when the WTRU is performing DRX in accordance with the long DRX cycle length; and
   start the on-duration timer when the WTRU is performing DRX in accordance with a short DRX cycle length, wherein the WTRU is configured to start the on-duration timer when performing DRX in accordance with the short DRX cycle length irrespective of whether the WUS is received during the period of time prior to the start of DRX active time when performing DRX in accordance with the short DRX cycle length, and wherein the long DRX cycle length is longer than the short DRX cycle length.

2. The WTRU of claim 1, further configured to use the WUS to determine when to monitor for PDCCH transmissions based on a configuration.

3. The WTRU of claim 1, wherein DRX active time comprises one or more of:
time(s) during which the on-duration timer is running;
time(s) during which an inactivity timer is running;
time(s) during which a retransmission timer is running; or
time(s) during which a random-access contention resolution timer is running.

4. The WTRU of claim 1, wherein the WUS comprises a reduced PDCCH monitoring signal associated with reducing a periodicity of monitoring for PDCCH transmissions.

5. The WTRU of claim 1, further configured to skip monitoring for PDCCH transmissions if the WUS is not received when performing DRX in accordance with the long DRX cycle length.

6. The WTRU of claim 1, wherein the WUS is associated with a PDCCH transmission received prior to the WTRU operating in DRX active time.

7. The WTRU of claim 1, wherein the WUS corresponds to a PDCCH transmission comprising downlink control information (DCI) with a cyclic redundancy check (CRC) that is scrambled with power savings radio network temporary identifier (PS-RNTI).

8. The WTRU of claim 1, wherein the WUS is indicated using a payload of a downlink control information (DCI) comprised in a PDCCH transmission.

9. The WTRU of claim 1, further configured to monitor for PDCCH transmissions for detection of the WUS in one or more search space sets.

10. A method of saving power for a wireless transmit/receive unit (WTRU), the method comprising:
receiving a wakeup signal (WUS) during a period of time prior to a start of discontinuous reception (DRX) active time when performing DRX in accordance with a long DRX cycle length;
starting an on-duration timer when performing DRX in accordance with the long DRX cycle length in response to receiving the WUS, wherein the WUS indicates that the WTRU is to monitor for physical downlink control channel (PDCCH) transmissions during DRX active time when the WTRU is performing DRX in accordance with the long DRX cycle length; and
starting the on-duration timer when the WTRU is performing DRX in accordance with a short DRX cycle length, wherein the WTRU is configured to start the on-duration timer when performing DRX in accordance with the short DRX cycle length irrespective of whether the WUS is received during the period of time prior to the start of DRX active time when performing DRX in accordance with the short DRX cycle length, and wherein the long DRX cycle length is longer than the short DRX cycle length.

11. The method of claim 10, further comprising using the WUS to determine when to monitor for PDCCH transmissions based on a configuration.

12. The method of claim 10, wherein DRX active time comprises one or more of:
time(s) during which the on-duration timer is running;
time(s) during which an inactivity timer is running;
time(s) during which a retransmission timer is running; or
time(s) during which a random-access contention resolution timer is running.

13. The method of claim 10, wherein the WUS comprises a reduced PDCCH monitoring signal associated with reducing a periodicity of monitoring for PDCCH transmissions.

14. The method of claim 10, further comprising skipping monitoring for PDCCH transmissions if the WUS is not received when performing DRX in accordance with the long DRX cycle length.

15. The method of claim 10, wherein the WUS is associated with a PDCCH transmission received prior to the WTRU operating in DRX active time.

16. The method of claim 10, wherein the WUS corresponds to a PDCCH transmission comprising downlink control information (DCI) with a cyclic redundancy check (CRC) that is scrambled with power savings radio network temporary identifier (PS-RNTI).

17. The method of claim 10, wherein the WUS is indicated using a payload of a downlink control information (DCI) comprised in a PDCCH transmission.

18. The method of claim 10, further comprising monitoring for PDCCH transmissions for detection of the WUS in one or more search space sets.

* * * * *